United States Patent
Kang et al.

(10) Patent No.: US 10,257,614 B2
(45) Date of Patent: Apr. 9, 2019

(54) SENSORY SIGNAL OUTPUT APPARATUS

(71) Applicant: YEIL ELECTRONICS CO., LTD., Incheon (KR)

(72) Inventors: Yoon Kyu Kang, Gyeonggi-do (KR); Jae Yong Kim, Busan (KR)

(73) Assignee: YEIL ELECTRONICS CO., LTD., Incheon (KR)

( * ) Notice: Subject to any disclaimer, the term of this patent is extended or adjusted under 35 U.S.C. 154(b) by 60 days.

(21) Appl. No.: 15/329,206

(22) PCT Filed: Apr. 23, 2015

(86) PCT No.: PCT/KR2015/004063
§ 371 (c)(1),
(2) Date: Jan. 25, 2017

(87) PCT Pub. No.: WO2016/017903
PCT Pub. Date: Feb. 4, 2016

(65) Prior Publication Data
US 2018/0213329 A1      Jul. 26, 2018

(30) Foreign Application Priority Data

Jul. 29, 2014  (KR) .................. 10-2014-0096267
Aug. 13, 2014  (KR) .................. 10-2014-0104883

(51) Int. Cl.
*H04R 9/06* (2006.01)
*H02K 33/18* (2006.01)
(Continued)

(52) U.S. Cl.
CPC ............. *H04R 9/06* (2013.01); *H02K 33/18* (2013.01); *H04R 7/16* (2013.01); *H04R 9/046* (2013.01);
(Continued)

(58) Field of Classification Search
CPC .... H04R 9/046; H04R 9/025; H04R 2400/11; H04R 7/16; H04R 9/02; H04R 9/06;
(Continued)

(56) References Cited

U.S. PATENT DOCUMENTS 5,682,132 A * 10/1997 Hiroyoshi ................ G08B 6/00
                                                                310/29
6,777,895 B2 * 8/2004 Shimoda .................. B06B 1/045
                                                                318/114
7,525,403 B2 * 4/2009 Kim ........................ B06B 1/045
                                                                310/12.22

FOREIGN PATENT DOCUMENTS

JP      2014104463      6/2014
KR      100842093       6/2008
(Continued)

*Primary Examiner* — Sunita Joshi
(74) *Attorney, Agent, or Firm* — IP & T Group LLP

(57) ABSTRACT

The present invention relates to a sensory signal output apparatus, and more particularly, to a sensory signal output apparatus for generating a sound or a vibration force, in which a magnetic circuit thereof is vibrating in response to an alternating signal of the coil fixed to a case, the magnetic circuit being elastically rebounded and supported by an elastic rebound body, and the elastic rebound body being fixed to an open part of the case; wherein elastic rebound and support paths of the elastic rebound body are traversing the center of the open part of the case in a straight line having the shortest distance, are three-dimensionally traversing such that both the side ends and the middle part thereof have an altitude difference therebetween, and elastically rebounds and supports the magnetic circuit.

24 Claims, 23 Drawing Sheets

(51) Int. Cl.
*H04R 7/16* (2006.01)
*H04R 9/04* (2006.01)
H04R 9/02 (2006.01)
H04R 11/02 (2006.01)

(52) U.S. Cl.
CPC ............... *H04R 9/02* (2013.01); *H04R 9/025* (2013.01); *H04R 9/04* (2013.01); *H04R 9/066* (2013.01); *H04R 11/02* (2013.01); *H04R 2209/024* (2013.01); *H04R 2400/03* (2013.01); *H04R 2400/11* (2013.01)

(58) Field of Classification Search
CPC .... H04R 1/028; H04R 1/1091; H04R 29/001; H04R 2460/13; H04R 2499/11; H04R 2499/15; B06B 1/045
USPC .................................................. 381/151, 162
See application file for complete search history.

(56) References Cited

FOREIGN PATENT DOCUMENTS

| | | |
|---|---|---|
| KR | 1020080048377 | 6/2008 |
| KR | 100850487 | 8/2008 |
| KR | 100894656 | 4/2009 |
| KR | 1020100052753 | 5/2010 |
| KR | 101094651 | 12/2011 |
| KR | 1020120127152 | 11/2012 |
| KR | 1020130001431 | 1/2013 |

\* cited by examiner

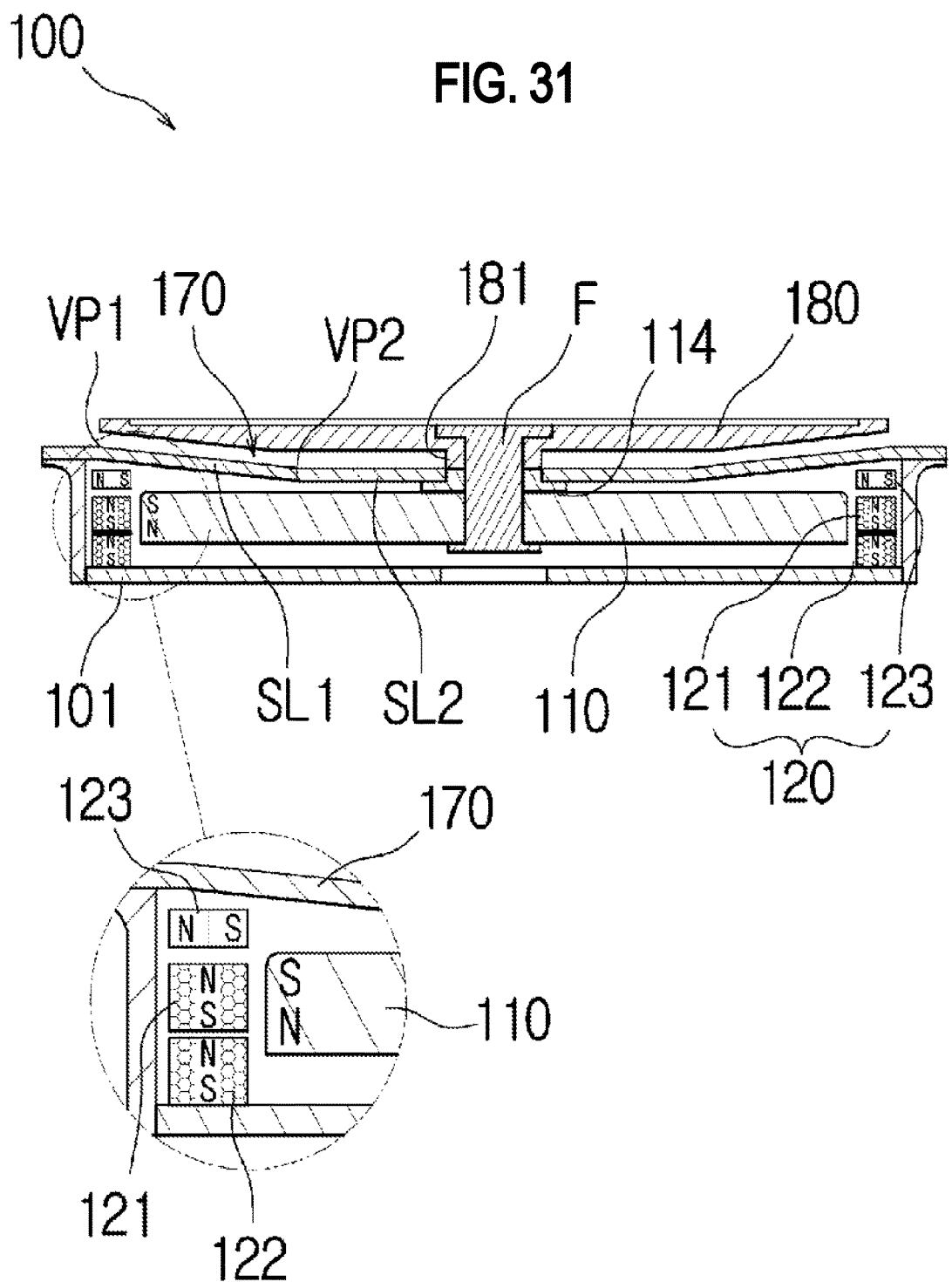

SENSORY SIGNAL OUTPUT APPARATUS

This application is a national stage application of PCT/KR2015/004063 filed on Apr. 23, 2015, which claims priority of Korean patent application number 10-2014-0096267, Korean patent application number 10-2014-0104883, filed on Jun. 29, 2014 and Aug. 13, 2014, respectively. The disclosure of each of the foregoing applications is incorporated herein by reference in its entirety.

TECHNICAL FIELD

The present invention relates to a sensory signal output apparatus, and more particularly, to a sensory signal output apparatus for generating a sound or/and a vibration force, in which a magnetic circuit thereof is vibrating in response to an alternating signal of the coil fixed to a case, the magnetic circuit being elastically rebounded and supported by an elastic rebound body, and the elastic rebound body being fixed to an open part of the case; wherein elastic rebound and support paths of the elastic rebound body are traversing the center of the open part of the case in a straight line having the shortest distance, are three-dimensionally traversing such that both the side ends and the middle part thereof have an altitude difference therebetween, and elastically rebounds and supports the magnetic circuit; and wherein the magnetic circuit, the elastic rebound body, and an output transmission body are formed along a major axis, the output transmission body being vibrating while supported by the elastic rebound body, the output transmission body and a pair of the magnetic circuit spaced apart to each other at the middle part of the elastic rebound body being coupled to the elastic rebound body, the magnetic circuit comprising magnets only, and the coil being of a dual type.

BACKGROUND ART

In general, a sensory signal output apparatus is an apparatus, such as a speaker, a receiver, a buzzer or a vibratory device (including a vibrator and a linear motor), which converts an electrical signal input from a signal source into a mechanical signal to output a sound or a vibration force, and a bone conduction output apparatus is included.

According to a related art, as shown in FIG. 1, in a sensory signal output apparatus, a magnetic circuit including a magnet 4 and a top plate 5 (a yoke and/or a weight may be further included depending on function and design) which reacts to a magnetic flux generated in a gap according to a direction of an alternating signal applied to a coil 6 which is placed in a space (gap) in an outer circumferential direction or an inner circumferential direction of a yoke 3, the magnet 4, and the top plate 5 generates a vibration force while vibrating, wherein the magnet 4 and the top plate 5 are sequentially stacked on and fixed to a top surface of the yoke 3 through welding-, bonding-, or fitting-fixing, and the bone conduction output apparatus has the same configuration as above. In this case, the magnet 4 and the top plate 5 are corresponding to the magnetic circuit and the coil 6 is corresponding to a vibration-causing portion. The sensory signal output apparatus having the above structure is generally accommodated in a housing-type case 1 and a cover 2, and the yoke 3 to which the magnet 4 and the top plate 5 are fixedly mounted, that is, the magnetic circuit, is supported by a separate leaf spring 7 and fixed to the case 1 (e.g., fixed by a rivet 8, welding-fixed, or fixed to the case by injection molding).

However, because most of the conventional sensory signal output apparatuses are formed in a circular shape and have a large size including the area thereof, the sensory signal output apparatus as described above is limited in application to portable Information Technology (IT) devices which are becoming slimmer, and there is a problem of restricting the slimmer trend of the portable IT devices. When the entire size including the area is miniaturized with the trend of slimming portable IT devices, there may be a problem that a vibration output is lowered and characteristics of high output are restricted. An output may be improved by a structure in which the coil 6 and the magnetic circuit are arranged at a distance at the side of each other along a long axis, but in the conventional long-axis sensory signal output apparatus, each of the coil 6 and the magnetic circuit at each side has a frequency deviation, and thus an error occurs in vibration, which causes a vibrating body to be twisted or causes distortion. In addition, since the magnetic circuit includes the yoke 3 to which the magnet 4 and the top plate 5 are fixedly mounted, a ratio of the volume of magnet relative to the volume of the entire apparatus is small and thus the magnetic force is low. Also, the movement of the magnetic circuit is not restrained in the vibration process and may deviate from the range of vibration, so that a problem arises in that the magnetic circuit collides with the case and generates static (noise), and in order to address this problem, a separate buffering means is required.

Meanwhile, as shown in FIG. 2, in a sensory signal output apparatus according to a related art, an elastically rebounding and supporting means, that is, a leaf spring 7, includes an elastic rebound arm 7c formed between and spaced apart from a circular outer frame 7a and a center surface 7b, one end of the elastic rebound arm 7c is connected to the outer frame 7a and the other end is connected to the center surface 7b, wherein the elastic rebound arm 7c extends in an arc (curved) form while the connecting portions are located at mutually displaced positions.

In the leaf spring 7 as described above, the elastic rebound arm 7c is in the arc (curved) form, so that a response speed of vibration is delayed and thus it is difficult to acquire a quick and precise output characteristic. In addition, connecting portions of each end of the elastic rebound arm 7c are distorted when vibrating, and thus there is a problem that the corresponding portions are torn (damaged) by frequent vibration. Moreover, it may be impossible or difficult to apply the sensory signal output apparatus to a narrow frame (a target to which the sensory signal output apparatus is to be fixed), such as Google Glass phones.

Technical Problem

The present invention is devised in an effort to address the above-described problems of the related arts, and an objective of the present invention is to provide a sensory signal output apparatus for generating a sound or/and a vibration force, in which a magnetic circuit thereof is vibrating in response to an alternating signal of the coil fixed to a case, the magnetic circuit being elastically rebounded and supported by an elastic rebound body, and the elastic rebound body being fixed to an open part of the case; wherein elastic rebound and support paths of the elastic rebound body are traversing the center of the open part of the case in a straight line having the shortest distance, are three-dimensionally traversing such that both the side ends and the middle part thereof have an altitude difference therebetween, and elastically rebounds and supports the magnetic circuit; and wherein the magnetic circuit, the elastic rebound body, and an output transmission body are formed along a major axis, the output transmission body being vibrating while supported by the elastic rebound body, the output transmission body and a pair of the magnetic circuit spaced apart to each other at the middle part of the elastic rebound body being coupled to the elastic rebound body, the magnetic circuit comprising magnets only, and the coil being of a dual type.

Technical Solution

In order to achieve the above objective, the present invention provides a sensory signal output apparatus 100 which generates a sound or a vibration while a magnetic circuit 110 thereof vibrates according to directions of an alternating signal applied to a coil 120, wherein the sensory signal output apparatus 100 includes an elastic rebound body 170 which elastically rebounds and three-dimensionally supports the magnetic circuit 110, or both the magnetic circuit 110 and an output transmission body 180, the output transmission body 180 being configured to transmit an output to the outside or a human body, and wherein the elastic rebound body 170 has an altitude difference between both side ends and middle part thereof and traverses an open part of a case 101 through the shortest path.

In addition, the present invention provides a sensory signal output apparatus which generates a sound or a vibration while a magnetic circuit 110 thereof vibrates according to directions of an alternating signal applied to a coil 120, wherein the magnetic circuit 110 generates a sound or a vibration while vibrating in the case 101 under the support of an elastic rebound body 170 according to a direction (polarity) of an alternating signal (N-S->S-N) applied to a vibration causing portion 120, wherein the vibration causing portion 120 is placed on a path of vibration of the magnetic circuit 110 so that a buffering force is provided in a direction of traveling of the magnetic circuit 110 and a repulsive force is multiplied in a direction opposite to the direction of traveling.

Advantageous Effects

According to the present invention as described above, the elastic rebound body elastically rebounds and supports the magnetic circuit while an elastic rebound and support path of the elastic rebound body traverses a center of an open part of the case in a straight line which is the shortest distance, so that a vibration response in reaction to an alternating signal of the coil is quick and accurate and an output characteristic is improved, such as no loss in vibration-related operations.

In addition, the elastic rebound body elastically rebounds and supports the magnetic circuit while the elastic rebound body traverses a center of an open part of the case three-dimensionally in a state in which both side ends and a middle part thereof have an altitude difference therebetween, so that the magnetic circuit is prevented from colliding or interference with the elastic rebound body, and thereby the occurrence of noise is prevented.

In addition, a dual magnetic circuit consisting of a pair of magnets and a pair of top plates on a single yoke is elastically rebounded and supported by the elastic rebound body elongated along a major axis, the output transmission body elongated along the major axis is provided to the elastic rebound body at an opposite direction to the magnetic circuit, so that the output is transmitted over the entire major axis of the output transmission body and the output is spread and transmitted through a portion having a narrow width, but a long length. In addition, both sides of the output transmission body elongated along the major axis are fixed to the elastic rebound body, so that an equal, but distortion-free output is allowed over the entire length and area of the output transmission body.

Moreover, the magnetic circuit generates a sound or a vibration while vibrating in the case under the support of the elastic rebound body according to directions of an alternating signal applied to the vibration causing portion, wherein the vibration causing portion is provided on a path of vibration of the magnetic circuit such that a repulsive force is multiplied in a direction opposite to a direction of traveling of the magnetic circuit and a buffering force is provided in the direction of traveling, and accordingly, a vibration buffering force is provided without a separate complicated buffering means, while the output is increased.

Further, the magnetic circuit consists of magnets only, so that a magnetic force of the magnet is maximized and the output is increased in comparison with a conventional sensory signal output apparatus of the same volume.

DESCRIPTION OF DRAWINGS

FIG. 31 is a cross-sectional view illustrating a configuration according to a twelfth embodiment of the present invention.

MODE FOR INVENTION

Figure 1:
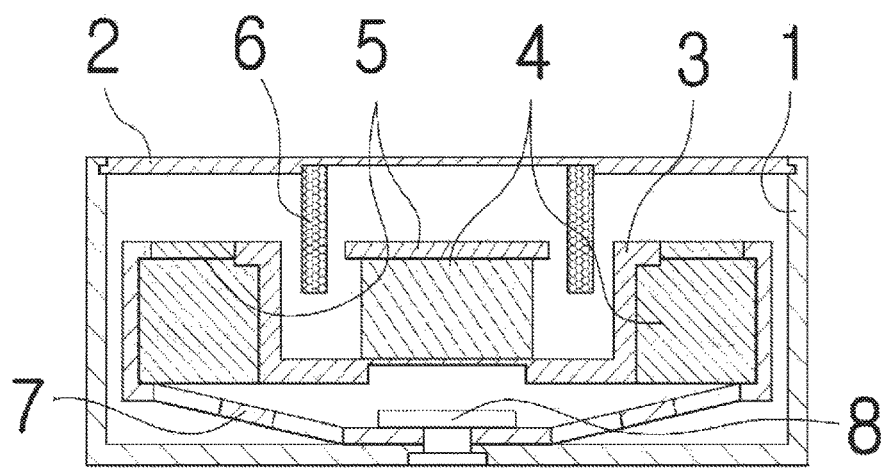
FIG. 1 is a cross-sectional view illustrating a configuration of a sensory signal output apparatus of a related art.
Figure 2:
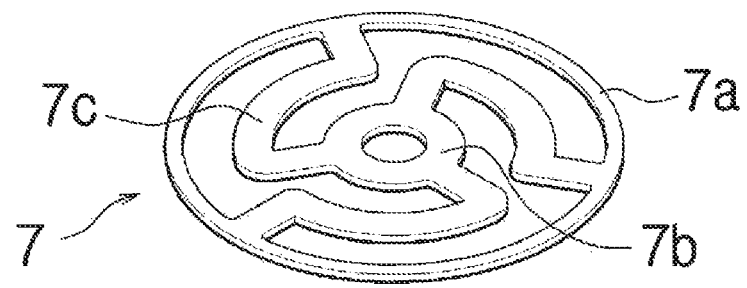
FIG. 2 is a perspective view illustrating a configuration of an elastic rebound body of a sensory signal output apparatus of a related art.
Figure 3:
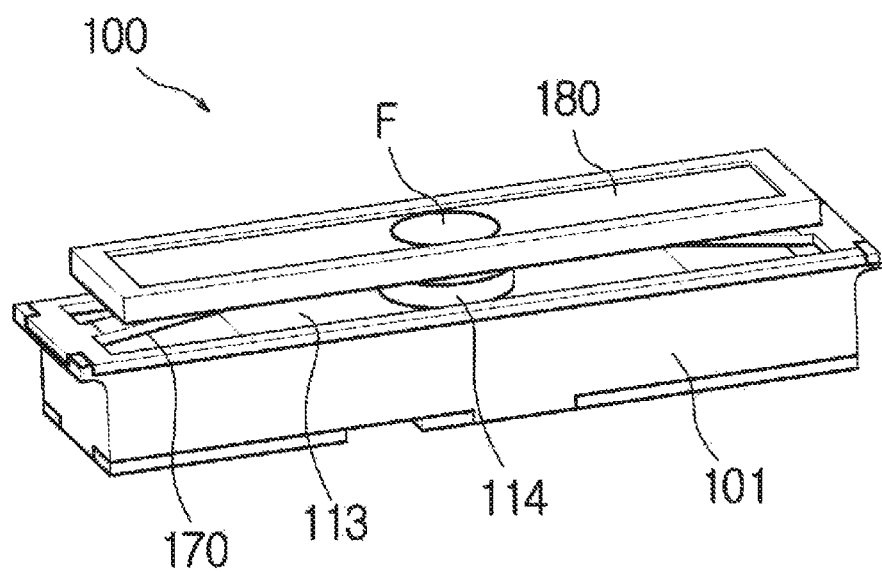
FIG. 3 is a perspective view illustrating a configuration according to a first embodiment of the present invention.
Figure 4:
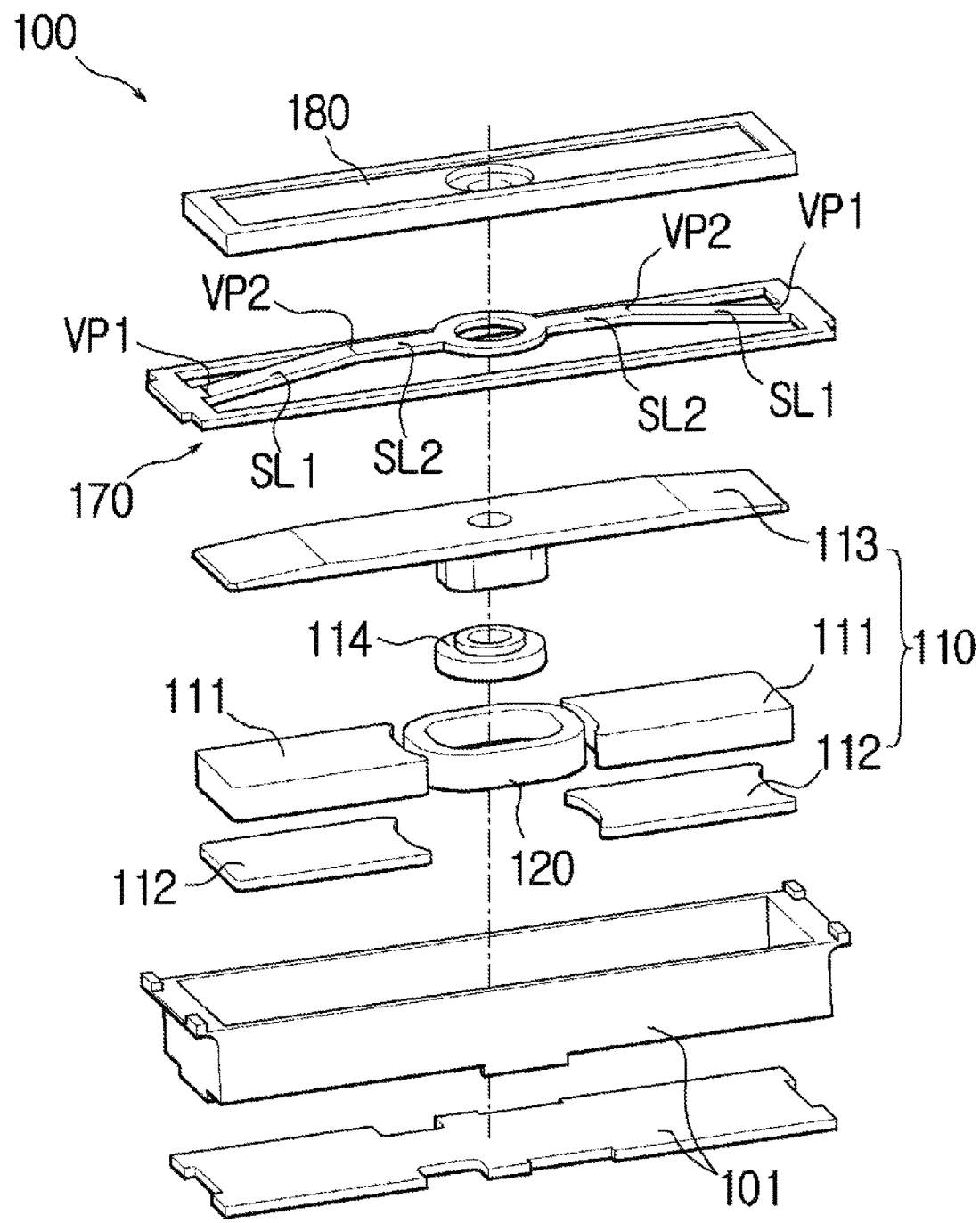
FIG. 4 is an exploded perspective view illustrating a configuration according to the first embodiment of the present invention.
Figure 5:
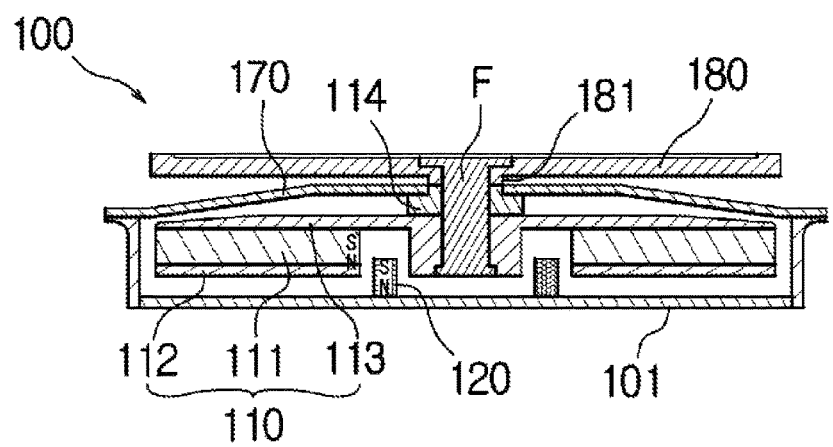
FIG. 5 is a cross-sectional view illustrating a configuration according to the first embodiment of the present invention.

The present invention will be described with reference to the accompanying drawings. First, as shown in FIGS. 3 to 5, a first embodiment of the present invention relates to a sensory signal output apparatus 100 which generates a sound or a vibration while a magnetic circuit 110 thereof vibrate according to directions of an alternating signal applied to a coil 120, and the sensory signal output apparatus 100 may include an elastic rebound body 170 which elastically rebounds and three-dimensionally supports the magnetic circuit 110, or both the magnetic circuit 110 and an output transmission body 180, wherein the output transmission body 180 is configured to transmit an output to the outside or a human body, and wherein the elastic rebound body 170 has an altitude difference between both side ends and the middle part thereof and traverses an open part of a case 101 through the shortest path.

Here, in the first embodiment, the elastic rebound body 170 may be a linear elastic rebound arm that extends from one side to another side of a circular, square, elliptical, or rectangular outer frame, wherein both sides closed to the outer frame of the elastic rebound arm are bent upwardly and extend into on ramps, and both ends of the on ramps extended are bent down and extend into a middle part that is extending horizontally.

In this case, only the magnetic circuit 110, or both the magnetic circuit 110 and the output transmission body 180 configured to transmit the output may be fixed to a surface of the middle part of the elastic rebound body 170 in opposite directions, wherein the middle part maintains in the horizontal position. In addition, the upwardly bent portions of the outer frames become first vibration points VP1 and horizontally bent portions become second vibration points VP2. The vibration points are reference points from which the vibration starts. Also, the upwardly inclined portions of both side ends become first elastic rebound and support paths SL1 and the horizontal portions in the middle part become second elastic rebound and support paths SL2. The elastic rebound and support paths are portions which are elastically rebounding, where the vibration actually takes place. In addition, the elastic rebound body 170 may have one elastic rebound arm in the form of a line (-), or two elastic rebound arms in the form of a cross (+).

Meanwhile, in the first embodiment, the magnetic circuit 110 may include: magnets 111 which generate magnetic forces while being formed in a circular or elliptical ring-type or a block type which is divided into two segments so as to form a space at the center thereof; top plates 112 which are stacked on the surfaces of the magnets 111 and concentrate the magnetic force of the magnets 111; and a yoke 113 which has a protrusion to provide a surface to which the magnets 111 are fixedly mounted, and at the same time to provide a path through which magnetic flux pass, while a gap in which magnetic flux is generated is formed in an inner circumferential space between the magnets 111 and the top plates 112 or a space in the center portion. The magnets 111 of the magnetic circuit 110 may be fixed to the yoke 113 by bonding, and the center of the yoke 113 may be coupled to the elastic rebound body 170 and the output transmission body 130 by a fixing means F penetrating therethrough, wherein first spacer 114 and second spacer 181 may be provided between the yoke 113 and the elastic rebound body 170, and between the elastic rebound body 170 and the output transmission body 180, respectively, to prevent interference during vibration. The first spacer 114 may be a separate block in the form of a rim, or may protrude from the center of one surface of the yoke 113 (the center is penetrated). In addition, the second spacer 181 may be a separate block in the form of a rim, or may protrude from the center of one surface of the output transmission body 180 (the center is penetrated).

Meanwhile, in the first embodiment, the coil 120 may be a voice coil which is bonded and fixed to a center of an inner bottom surface of the case 101 so as to be positioned in a gap defined by the magnets 111 and the protrusion of the yoke 113.

Meanwhile, in the first embodiment, the output transmission body 180 may be a circular, square, or rectangular block body, and a rectangle with a major axis and a minor axis is illustrated and described as an embodiment of the present invention.

Figure 6:
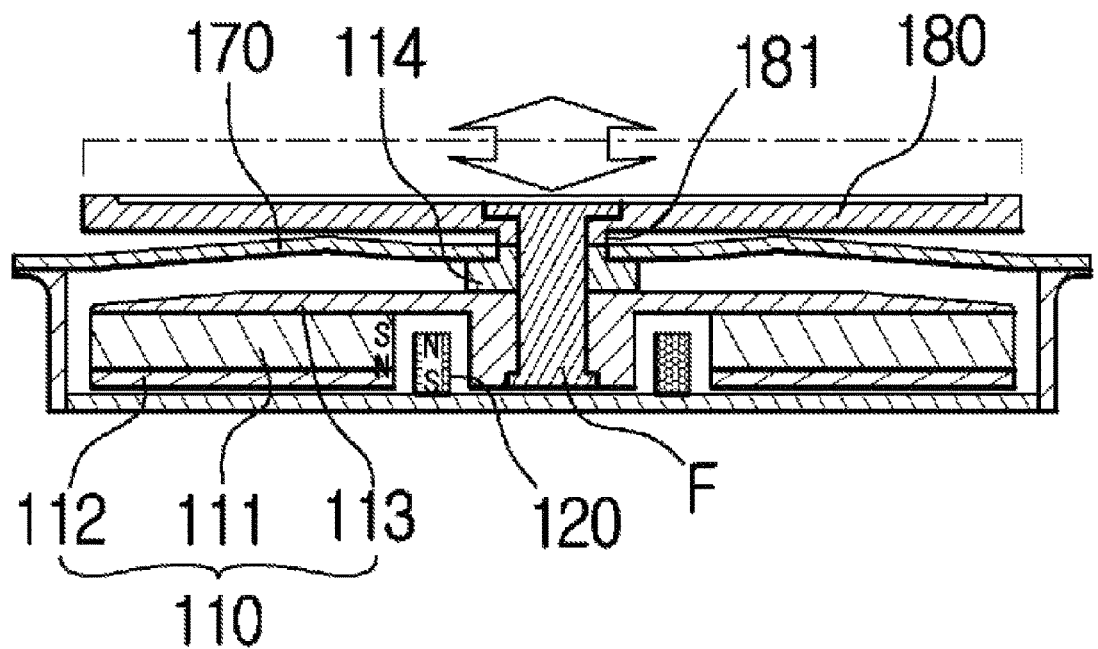
FIG. 6 is a perspective view illustrating an operational state of the first embodiment of the present invention.

In the first embodiment as described above, the coil 120 is positioned in the gap between the center protrusion of the yoke 113 and stacks of the magnets 111 and the top plates 112, wherein in reaction to an alternating signal applied to the coil 120, the magnetic circuit 110 which consists of the yoke 113, the magnet 111 and 111', and the top plate 112 and 112' is elastically fixed to the center of the elastic rebound body 170, as shown in FIG. 6, generates vibration while vibrating upward and downward with respect to the coil 120 fixed to the inner bottom surface of the case 101. At this time, each of the first vibration points VP1 on both sides of the elastic rebound body 170 becomes a vibration reference point of the first elastic rebound and support path SL1, and each of the second vibration points VP2 becomes a vibration reference point of the second elastic rebound and support path SL2, wherein the first elastic rebound and support path SL1 is bent and straightened between the first vibration point VP1 and the second vibration point VP2 to provide an elastic repulsive force for vibration, and the second elastic rebound and support path SL2 is bent and straightened between the second vibration point VP2 at one side and the second vibration point VP2 at the other side to provide an elastic repulsive force for vibration.

The output transmission body 180 is fixed to an outer side of the case 101 in the center portion of the elastic rebound body 170 which elastically rebounds as described above, so that the vibration force is transmitted to the outside or the human body, that is, bone conduction is carried out. In the first embodiment described above, the magnetic circuit 110 is elastically rebounded and supported by the elastic rebound body 170, which has the elastic rebound and support path traversing the center of an open part of the case 101 in a straight line which is the shortest distance, and accordingly, there is an advantage in that a vibration response speed in reaction to an alternating signal of a coil is more accurate and quicker than a related art in which a vibration response speed in response to the alternating signal of the coil is a curve.

Figure 7:
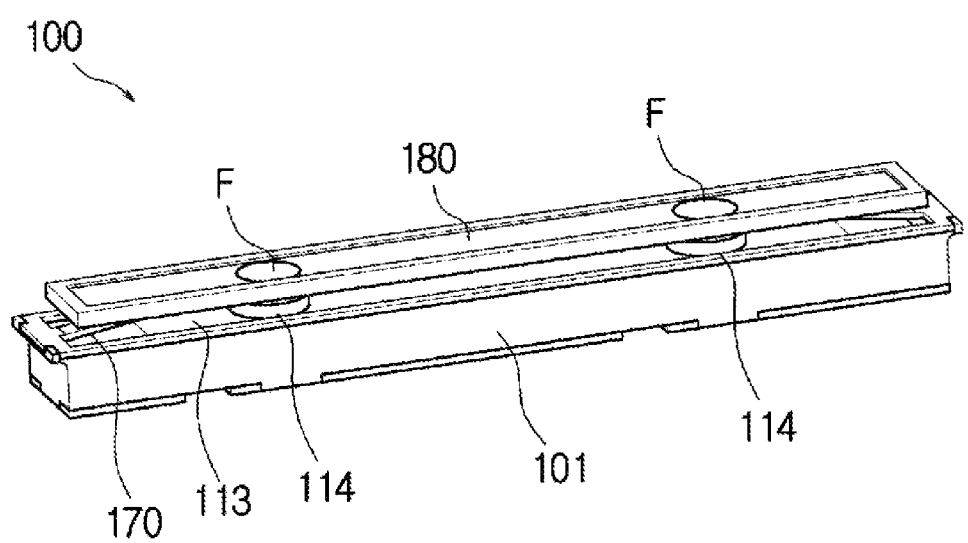
FIG. 7 is a perspective view illustrating a configuration according to a second embodiment of the present invention.
Figure 8:
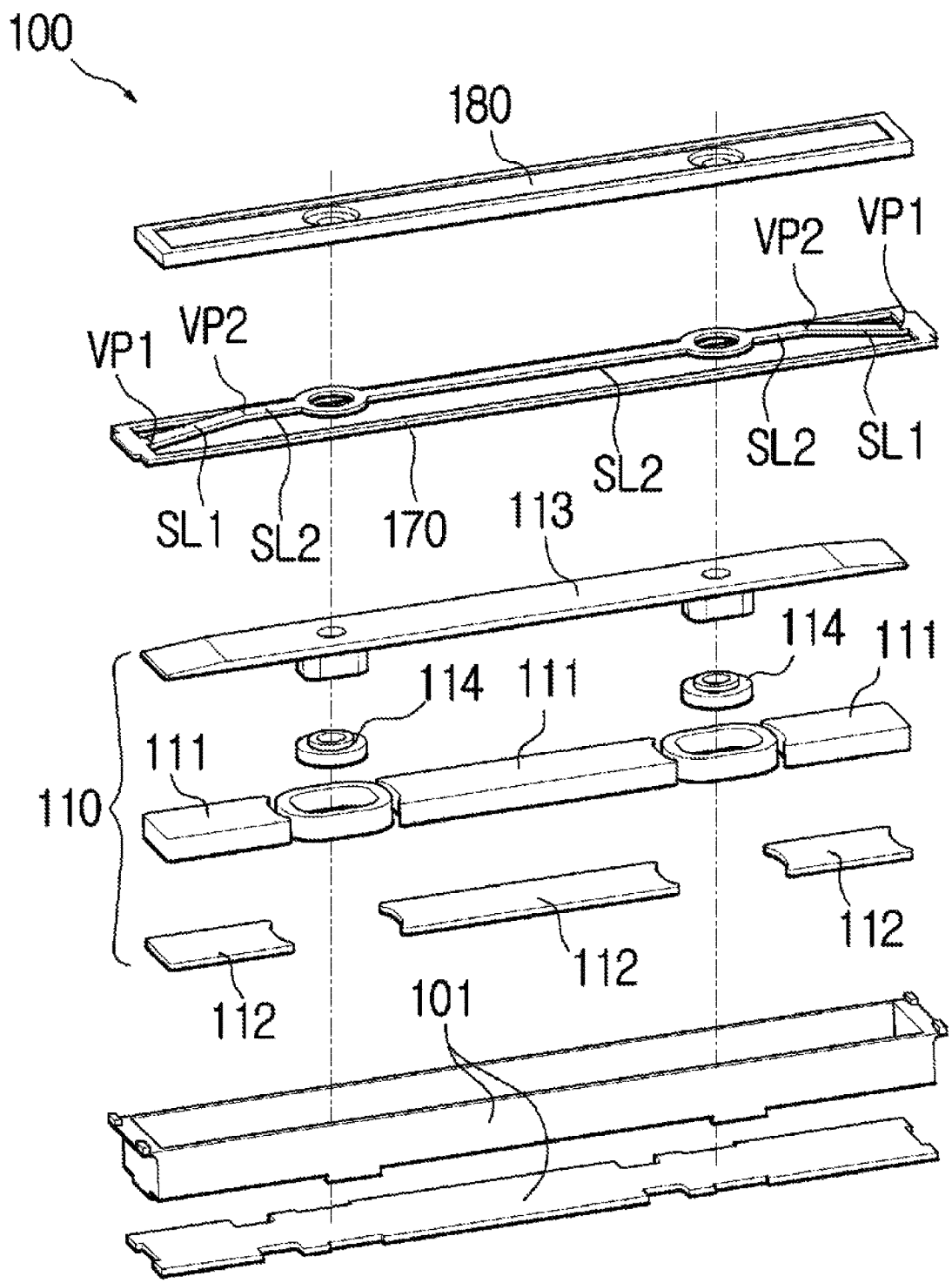
FIG. 8 is an exploded perspective view illustrating a configuration according to the second embodiment of the present invention.
Figure 9:
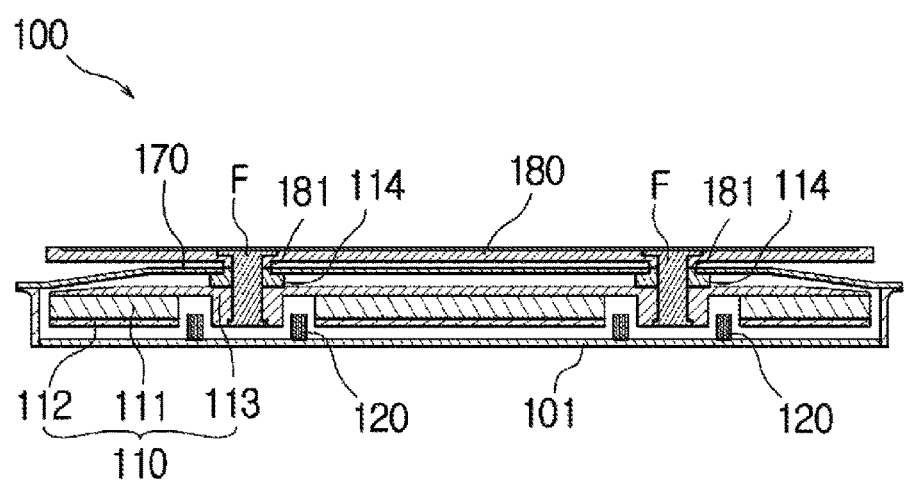
FIG. 9 is a cross-sectional view illustrating a configuration according to the second embodiment of the present invention.

Then, a second embodiment of the present invention relates to a sensory signal output apparatus 100 which generates a sound or a vibration while a magnetic circuit 110 thereof vibrates according to an alternating signal applied to coils 120, as illustrated in FIGS. 7 to 9, wherein the sensory signal output apparatus 100 may include an elastic rebound body 170 which elastically rebounds and three-dimensionally supports only a pair of magnetic circuits 110 spaced apart from each other, or both the magnetic circuits 110 and an output transmission body 180, wherein the output transmission body 180 is configured to transmit an output to the outside or the human body, and wherein the elastic body 170 has an altitude difference between both side ends and the middle part thereof and traverses the major axis in an open part of a case 101 through the shortest path.

In the second embodiment, the elastic rebound body 170 may be a linear elastic rebound arm that extends from one side edge to another side edge of an elliptical or rectangular outer frame having a major axis and a minor axis, wherein both sides closed to the outer frame of the elastic rebound arm are bent upwardly and extend into on ramps, and both ends of the on ramps extended are bent down and extend into a middle part extending horizontally. In this case, the magnetic circuits 110, or both the magnetic circuits 110 and the output transmission body 180 configured to transmit the output, may be fixed to a surface of the middle part of the elastic rebound body 170 in opposite directions, wherein the middle part maintains in the horizontal position.

Meanwhile, in the second embodiment, the magnetic circuits 110 may include: magnets 111 which generate magnetic forces while being formed in a pair of circular or elliptical ring-type magnets spaced apart from each other, or formed in a block type which is divided into three segments so as to form spaces at each side thereof; top plates 112 which are stacked on one surface of the magnets 111 and concentrate the magnetic forces of the magnets 111; and a yoke 113 which has protrusions to provide surfaces to which the magnets 111 are fixedly mounted, and at the same time to provide paths through which the magnetic flux passes, while gaps are formed in inner circumferential spaces between the magnets 111 and the top plates 112 or in spaces formed at each side of the magnets 111.

Meanwhile, in the second embodiment, the coils 120 may be voice coils which are bonded and fixed to a center of an inner bottom surface of the case 101 so as to be positioned in gaps defined by the magnets 111 and the protrusions of the yoke 113.

Meanwhile, in the second embodiment, the output transmission body 180 may be an elliptical or rectangular block body, and a rectangle with a major axis and a minor axis is illustrated and described as an embodiment in the present invention. The other elements are not different from those in the first embodiment, and thus detailed descriptions thereof will be omitted.

In the second embodiment as described above, two magnetic circuits 110 each consisting of a pair of magnets 111 and a pair of top plates 112 on one yoke 113 are elastically rebounded and supported by the elastic rebound body 170 of the major axis, and the output transmission body 180 is provided to the elastic rebound body 170 at the opposite direction to the magnetic circuits 110, so that the output is transmitted over the entire major axis of the output transmission body 180 and the output is transmitted through a portion having a narrow width, but a long length, thereby increasing the transmission of the output. In addition, the present invention allows an equal, but distortion-free output over the entire length and area of the single output transmission body 180 even when vibration output varies due to a frequency deviation between different magnetic circuits 110 spaced apart from each other.

Then, a third embodiment of the present invention relates to an example in which an elastic rebound body 170 provides an elastic repulsive support force while traversing a case 101, wherein the elastic rebound body 170 has only an altitude difference while traversing a curved or a bent path, without traversing a straight line that is the shortest distance.

In the sensory signal output apparatus 100 which generates a sound or a vibration while magnetic circuits 110 thereof vibrate according to alternating signals applied to coils 120, fixing surfaces 171 are provided at a distance from and along a middle part or a length direction of an elliptical or rectangular outer frame to fix thereto only the magnetic circuits 110, or both the magnetic circuits 110 and an output transmission body 180, wherein the output transmission body 180 is configured to transmit an output to the outside or the human body, and wherein the fixing surfaces 171 exhibit an altitude difference from the outer frame at both sides thereof, wherein one sides of the fixing surfaces 171 may be connected to one side of a facing major axis of the outer frame and the other sides of the fixing surfaces 171 may be connected to the other side of the facing major axis of the outer frame. Here, the altitude difference may serve as the means for securing a space in which the magnetic circuits 110 vibrates.

Figure 10:
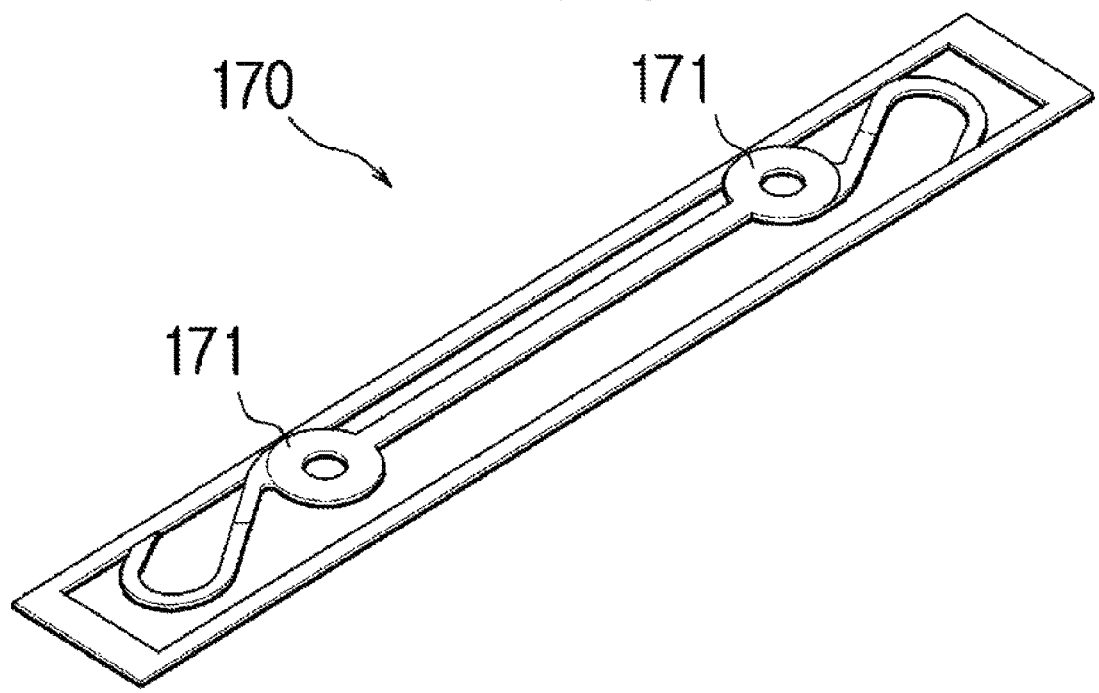
FIGS. 10 to 14 are perspective views illustrating examples of an elastic rebound body according to a third embodiment of the present invention.
Figure 11:
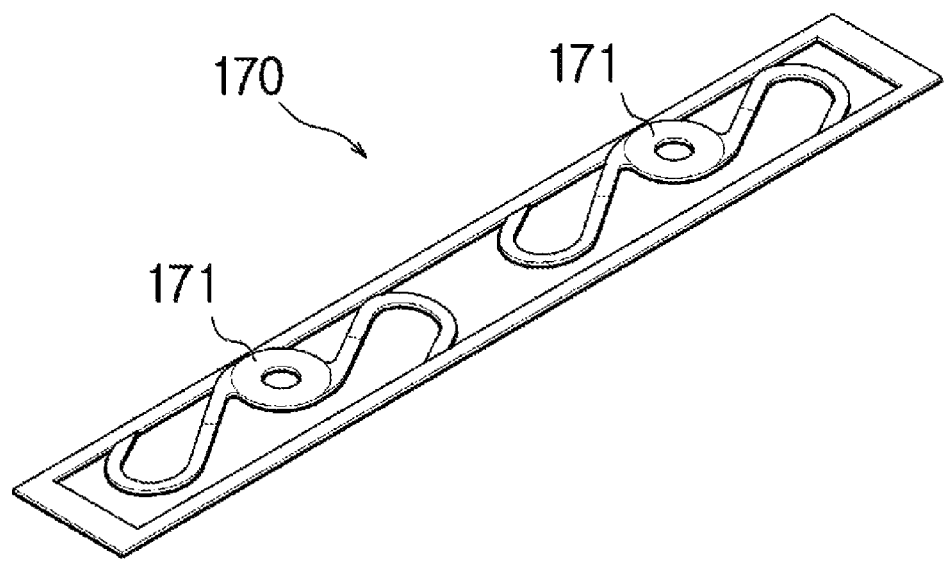
Figure 12:
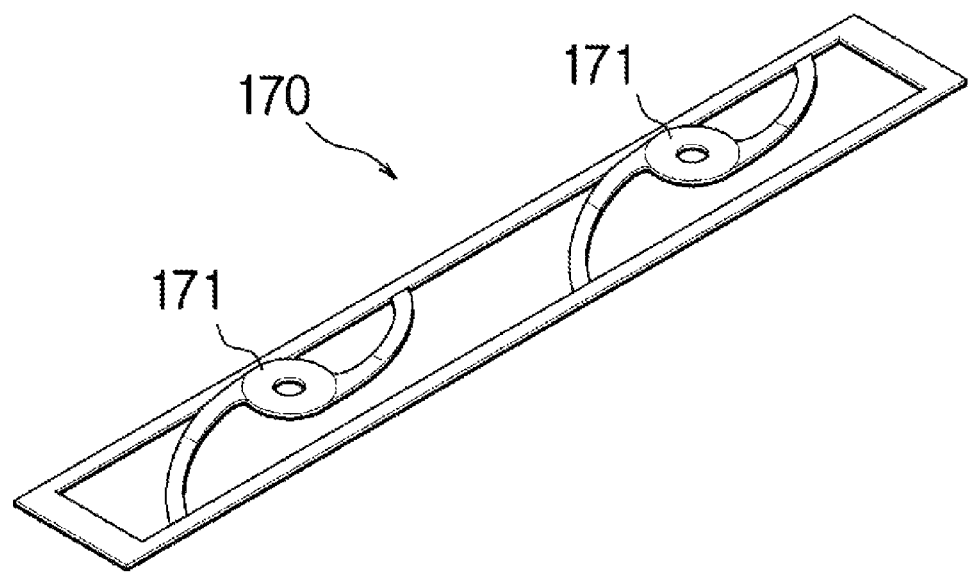
Figure 13:
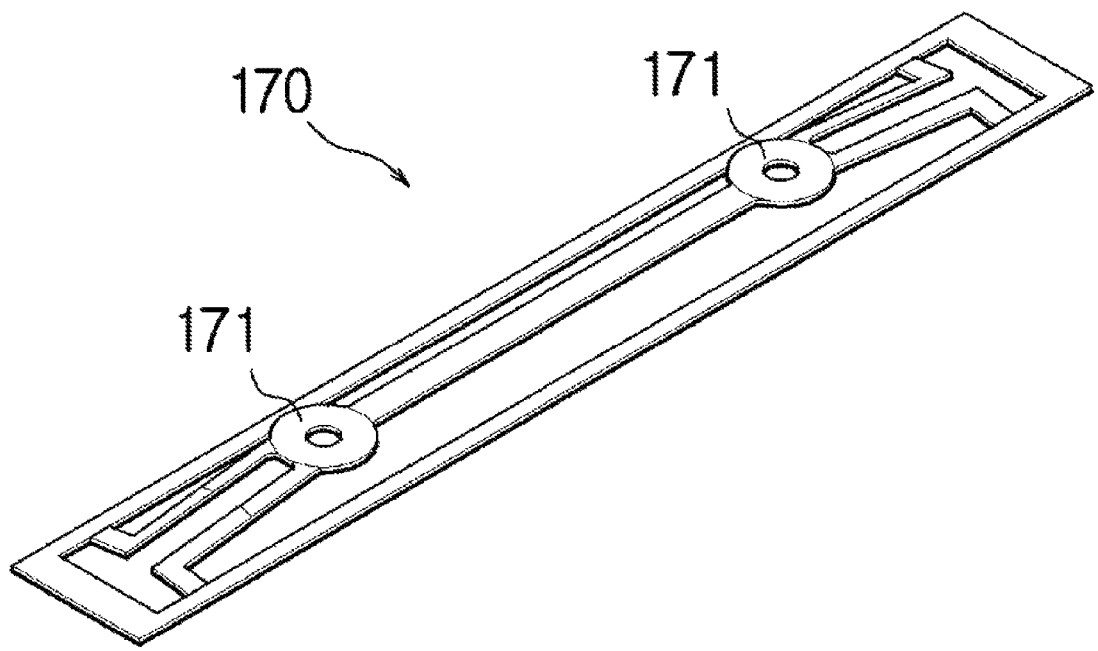
Figure 14:
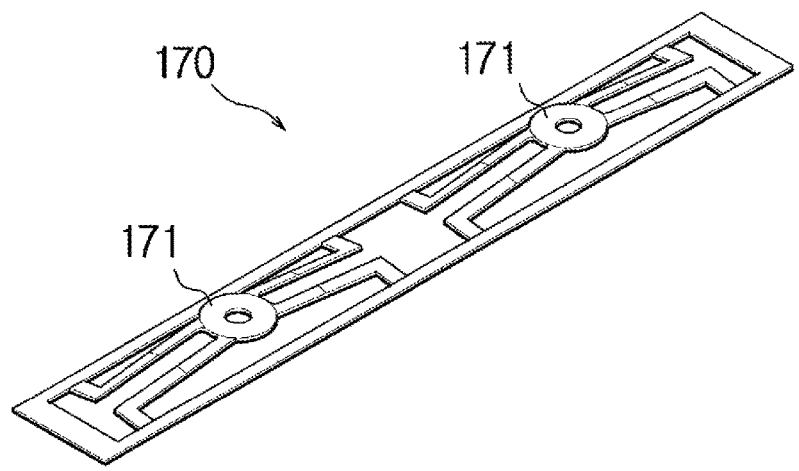

In this case, for the elastic rebound body 170, as shown in FIG. 10, a straight path between facing sides of the fixing surfaces 171 in a pair provides a surface for connecting to the elastic rebound body thereon, the other side of one fixing surface 171 may be connected to one of the facing major axes of the outer frame, and the other side of the other fixing surface 171 may be connected to the other facing major axis of the outer frame. Also, as shown in FIGS. 11 and 12, one side of each fixing surface 171 may be connected to one of the facing major axes of the outer frame, the other side of the each fixing surfaces 171 may be connected to the other facing major axis of the outer frame, and such fixing surfaces 171 are provided as a pair with a space therebetween. As shown in FIG. 13, a straight path between facing sides of a pair of fixing surfaces 171 provides a surface for connecting to the elastic rebound body thereon, the other side of one fixing surface 171 may be symmetrically connected to both the facing major axes of the outer frame, and the other side of the other fixing surface 171 may also be symmetrically connected to both the facing major axes of the outer frame. As shown in FIG. 14, one side of the fixing surface 171 may be symmetrically connected to both the facing major axes of the outer frame, the other side of the fixing surface 171 may also be symmetrically connected to both the facing major axes of the outer frame, and such fixing surfaces 171 are provided as a pair with a space therebetween. The third embodiment of the present invention is only an example of the elastic rebound arms which have elastic rebound and support paths of the elastic rebound body 170 of the first and second embodiments, and the output-related actions according to vibration are the same as those of the first and second embodiments.

Figure 15:
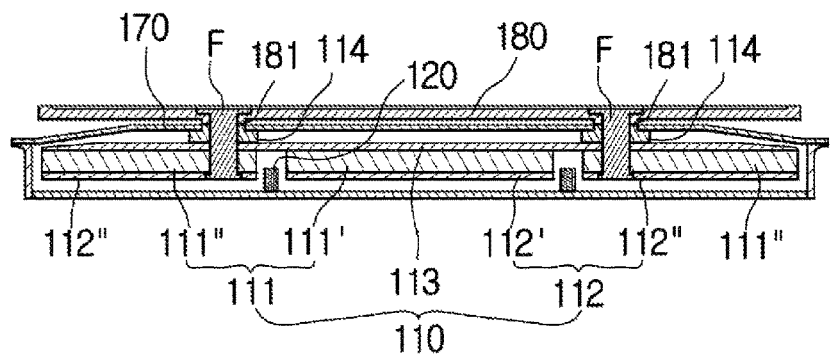
FIGS. 15 to 23 are cross-sectional views illustrating configurations according to a fourth to tenth embodiments of the present invention.

Then, in a fourth embodiment of the present invention as shown in FIG. 15, a magnetic circuit 110 including magnets 111 consisting of a circular or elliptical first magnet 111' and a ring-type or block-type second magnet 111" spaced apart from an outer frame of the first magnet 111', top plates 112 consisting of first and second top plates 112' and 112" stacked on one surface of the respective first magnet 111' and second magnet 111', and a yoke 113 providing a surface on which the magnet 111 is mounted; and a coil positioned in a gap between the first magnet 111' and the second magnet 111" are included, wherein the magnetic circuit 110 may be fixed to an elastic rebound body 170 by a fixing means F that penetrates both sides of the second magnet 111". In the fourth embodiment as described above, the magnetic force of the second magnet 111" is added while the first magnet 111' of the magnet 110 serves as a protrusion of the yoke 113, thereby increasing the magnetic force, and in turn improving the vibration output.

Figure 16:
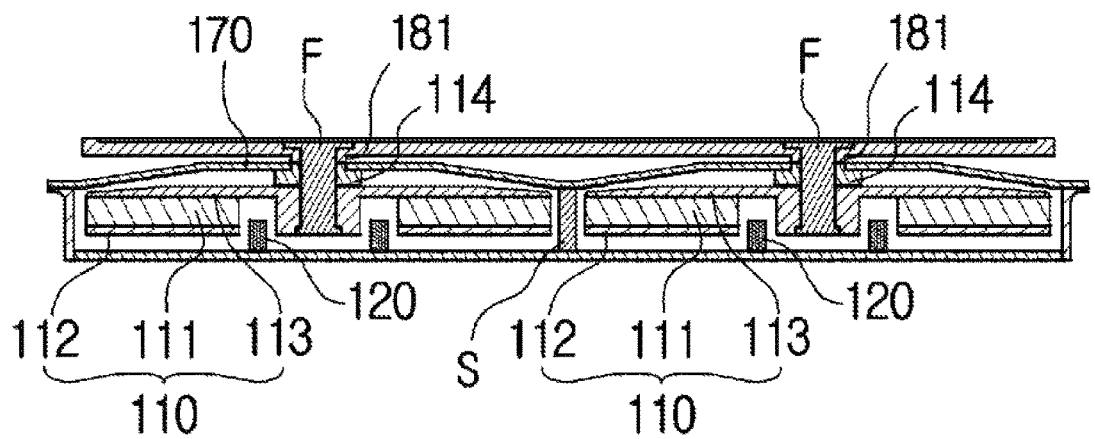

Then, in a fifth embodiment of the present invention, as shown in FIG. 16, the magnetic circuits 110 in a pair of the first embodiment are elastically rebounded and supported at a distance from each other by one elastic rebound body 170, and a middle part of the elastic rebound body 170 is supportively fixed to a case 101 by a supporting member S, the coils 120 are positioned respectively in gaps defined by each magnetic circuit 110 and the protrusions of the yoke 113, and an output transmission body 180 is fixed through an outer surface (a top surface in the drawing) of the elastic rebound body 170 by fixing means F that penetrate one magnetic circuit 110 and the other magnetic circuit 110. The fifth embodiment of the present invention as described above allows an equal, but distortion-free output over the entire length and area of the single output transmission body 180 even when vibration varies due to a frequency deviation of the different magnetic circuits 110 at both sides.

Figure 17:
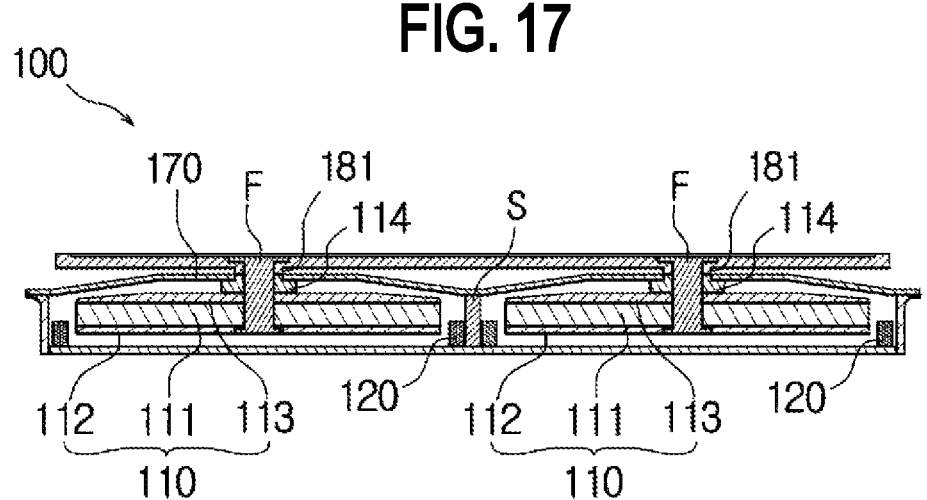

Then, in a sixth embodiment of the present invention, as shown in FIG. 17, a magnetic circuit 110 consists of top plates 112 stacked on one surface of magnets 111 and a yoke 113 stacked on the other surface, the magnetic circuits 110 in a pair are elastically rebounded and supported at a distance from each other by a single elastic rebound body 170, the middle part of the elastic rebound body 170 is supportively fixed to a case 101 by a supporting member S, and a coil 120 is positioned in an outer circumferential direction of each magnetic circuit 110, and an output transmission body 180 is fixed through an outer surface (a top surface in the drawing) of the elastic rebound body 170 by fixing members F that penetrate one magnetic circuit 110 and the other magnetic circuit 110. The sixth embodiment of the present invention as described above allows an equal, but distortion-free output over the entire length and area of the single output transmission body 180 even when vibration varies due to a frequency deviation of the different magnetic circuits 110 at both sides.

Figure 18:
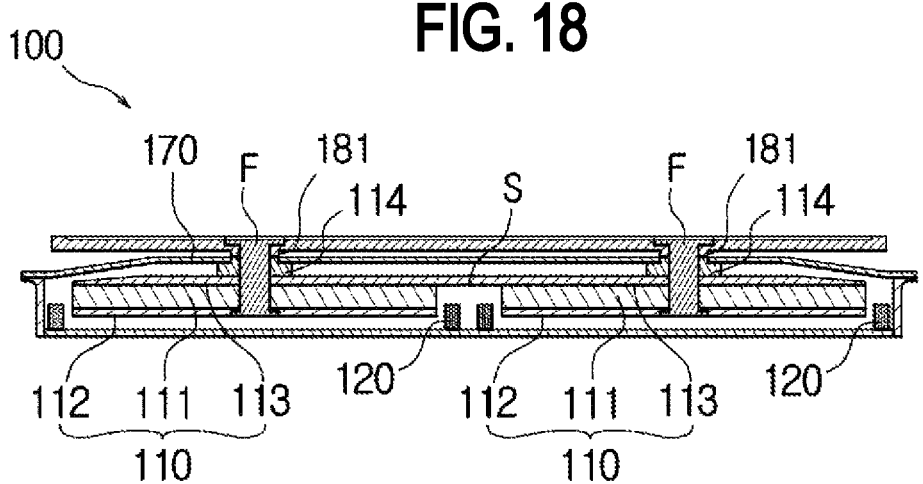

Then, in a seventh embodiment of the present invention, as shown in FIG. 18, a pair of magnetic circuits 110 spaced apart from each other, each of which is formed of stacks of magnets 111 and top plates 112, is provided on one surface of a single yoke 113, and coils 120 are positioned respectively at a distance from outer circumferences of the magnetic circuits 110, wherein each magnetic circuit 110 may be fixed through the elastic rebound body 170 by a fixing means F, and an output transmission body 180 may be fixed to an outer surface (a top surface in the drawing) of the elastic rebound body 170. The seventh embodiment of the present invention as described above allows an equal, but distortion-free output over the entire length and area of the single output transmission body 180 even when vibration varies due to a frequency deviation of the different magnetic circuits 110 at both sides.

Figure 19:
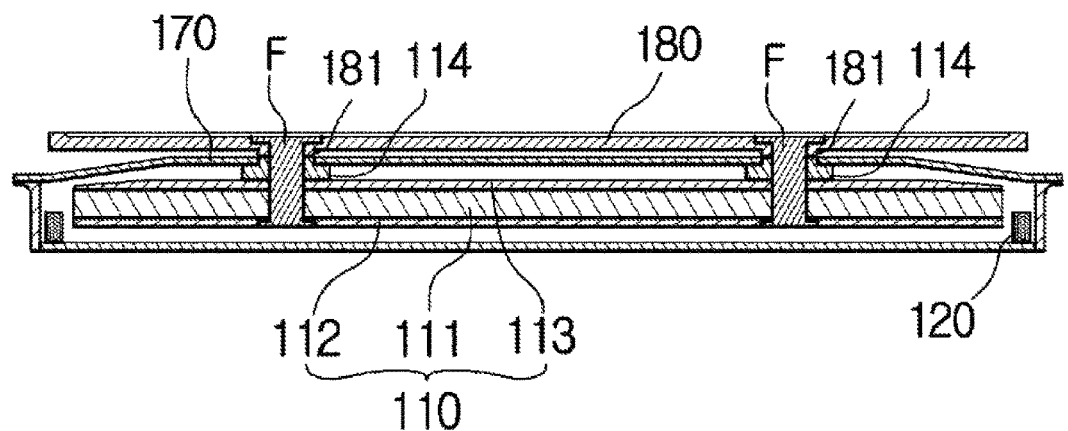

Then, in an eighth embodiment of the present invention, as shown in FIG. 19, a magnetic circuit 110 is formed of a stack of magnets 111 and top plates 112 on one surface of the yoke 113, and a coil 120 is positioned in an outer circumferential direction of the magnetic circuit 110, wherein the magnetic circuit 110 may be fixed to an elastic rebound body 170 by a pair of fixing means F penetrating at a distance from each other, and an output transmission body 180 may be fixed to an outer surface (a top surface in the drawing) of the elastic rebound body 170. According to the eighth embodiment of the present invention as described above, the magnetic circuit 110 forms a single block so that a magnetic force can be considerably increased as compared to the above embodiments, and a frequency deviation which occurs when a pair of magnetic circuits are provided is not generated, so that it is possible to obtain a stable and accurate vibration output.

Figure 20:
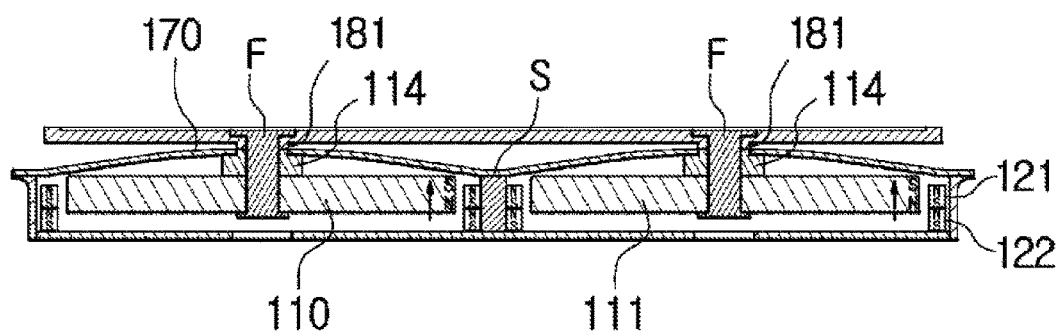
Figure 21:
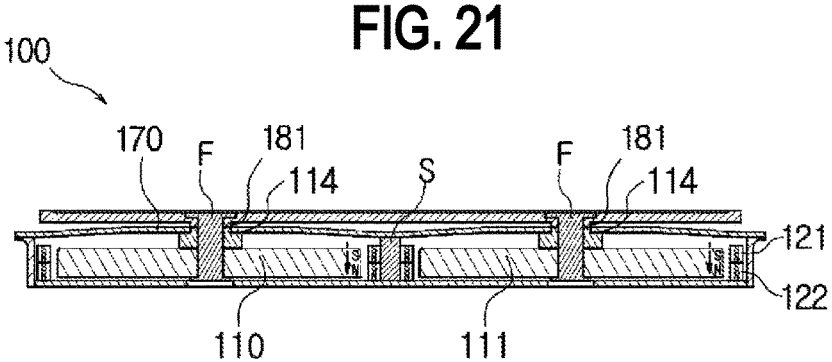

Then, in a ninth embodiment of the present invention, as shown in FIGS. 20 and 21, a pair of magnetic circuits 110 consisting of magnets only and being spaced apart from each other is provided, and a coil 120 is positioned at a distance from an outer circumference of each magnetic circuit 110, wherein each magnetic circuit 110 may be fixed through an elastic rebound body 170 by a fixing means F and an output transmission body 180 may be fixed to an outer surface (a top surface in the drawings) of the elastic rebound body 170. The ninth embodiment of the present invention as described above allows an equal, but distortion-free output over the entire length and area of the single output transmission body 180 even when vibration varies due to a frequency deviation of the different magnetic circuits 110 at both sides.

In this case, the coil 120 may consist of first coil 121 and second coil 122 which are disposed in a state in which the first coil 121 and the second coil 122 are in contact with or spaced apart from each other in a vibration direction of the magnetic circuits 110. Here, the magnetic poles of the respective first and second coils 121 and 122 may alternate between an N-S pole pair, i.e., an N-S-N-S pole pattern, and an S-N pole pair, i.e., an S-N-S-N pole pattern, and the magnet 111 may be in a state of being magnetized to have S (top in the drawings)-N (bottom in the drawings) poles. Accordingly, in the state in which each of the first and second coils 121 and 122 has an N-S pole pair, the S pole of the magnetic circuit 110 having an S-N pole pair acts attractively with the N pole of the first coil 121, and the N pole of the magnetic circuit 110 acts actively with the S pole of the first coil 121, so that the magnetic circuit 110 is pulled toward the first coil 121 (pulled upward in the drawing), as shown in FIG. 20. In this case, as shown in FIG. 21, when the magnetic pole pair of each first coil and 2 121 and 122 is switched to the S-N pole pair, the S pole of the magnetic circuit 110 having the S-N pole pair acts repulsively against the S pole of the first coil 121 and acts attractively with the N pole of the first coil 121, so that the magnetic circuit 110 is pulled toward the second coil 122 (pulled downward in the drawing) and is thereby caused to vibrate.

Figure 22:
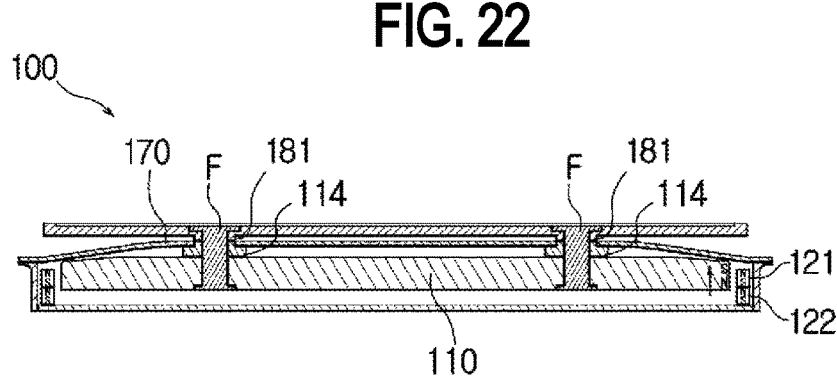
Figure 23:
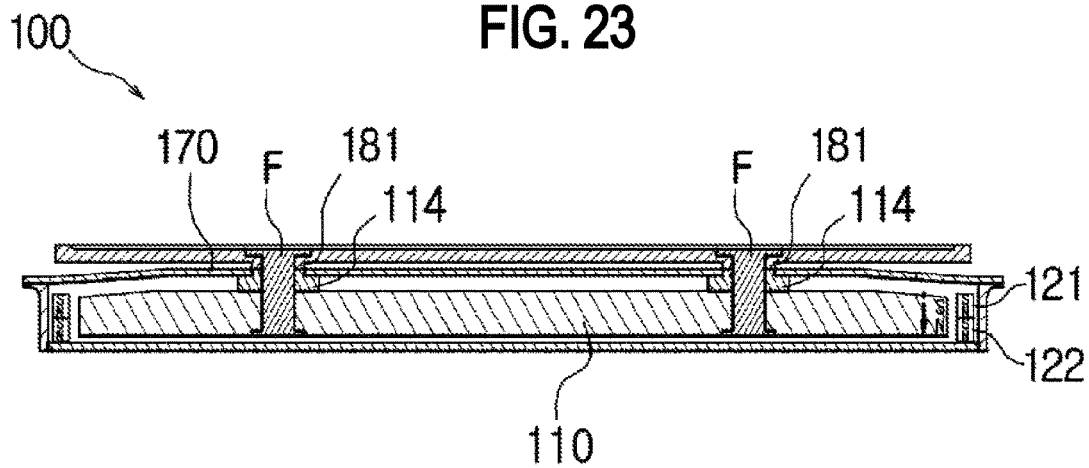

Then, in a tenth embodiment of the present invention, as shown in FIGS. 22 and 23, a magnetic circuit 110 may consist of magnets only, a coil 120 may be positioned at a distance from an outer circumference of the magnetic circuit 110, wherein both sides of the magnetic circuit 110 may be each fixed to an elastic rebound body 170 by a fixing means F and an output transmission body 180 may be fixed to an outer surface (a top surface in the drawings) of the elastic rebound body 170. The tenth embodiment of the present invention as described above allows an equal, but distortion-free output over the entire length and area of the single output transmission body 180 even when vibration varies due to a frequency deviation of the different magnetic circuits 110 at both sides.

In this case, like the ninth embodiment, the coil 120 may consist of first coil 121 and second coil 122 which are disposed to be in contact with or spaced apart from each other in a vibration direction of the magnetic circuit 110. Here, the magnetic poles of the respective first and second coils 121 and 122 may alternate between an N-S pole pair, i.e., an N-S-N-S pole pattern, and an S-N pole pair, i.e., an S-N-S-N pole pattern, and the magnet 111 may be in a state of being magnetized to have S (top in the drawings)-N (bottom in the drawings) poles. As such, the same operations as those in FIGS. 22 and 23 are shown, and the same behaviors and effects of the ninth embodiment are exhibited, and hence the descriptions of the operations of the tenth embodiment will be omitted.

Figure 24:
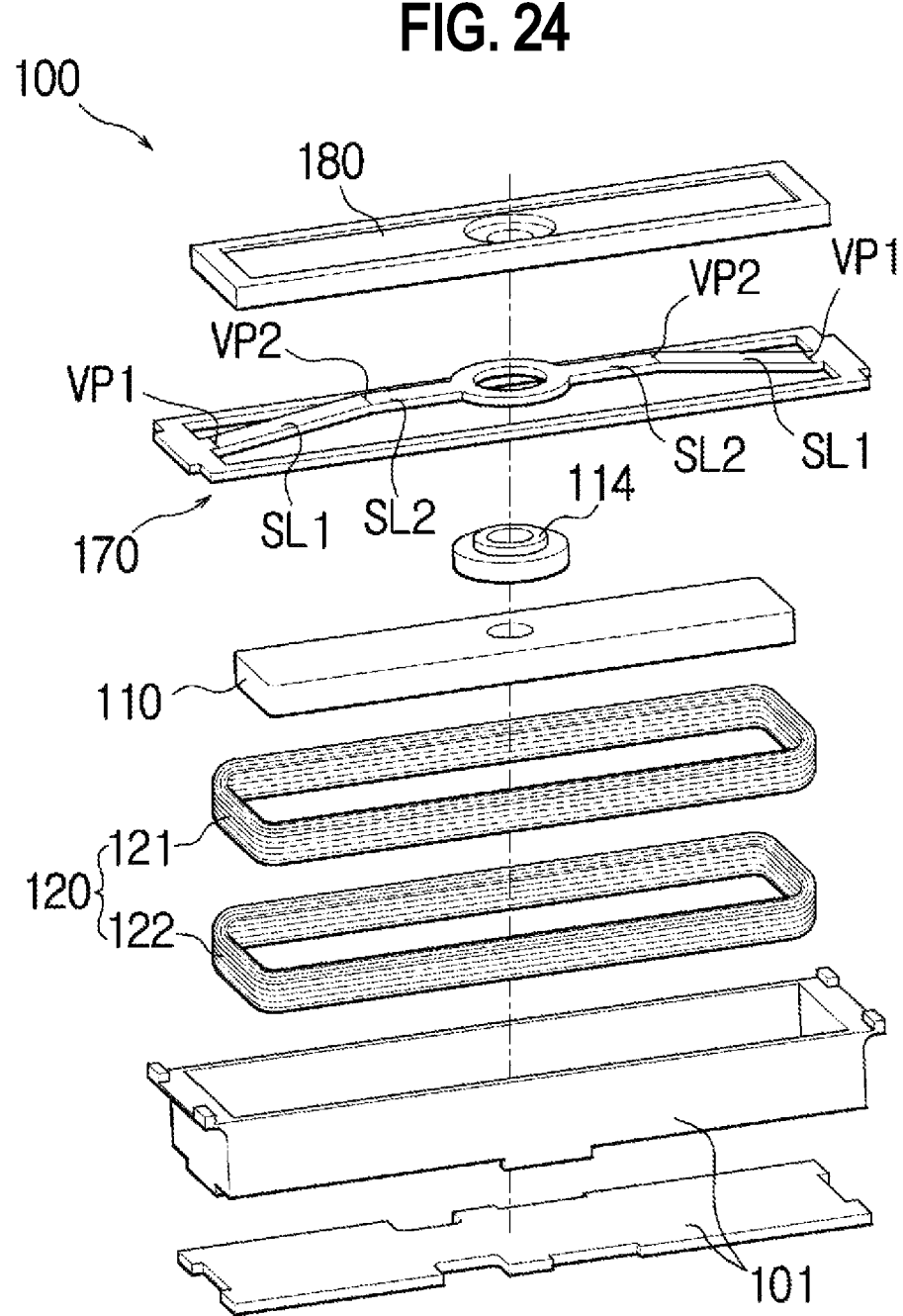
FIG. 24 is an exploded perspective view illustrating a configuration according to an eleventh embodiment of the present invention.
Figure 25:
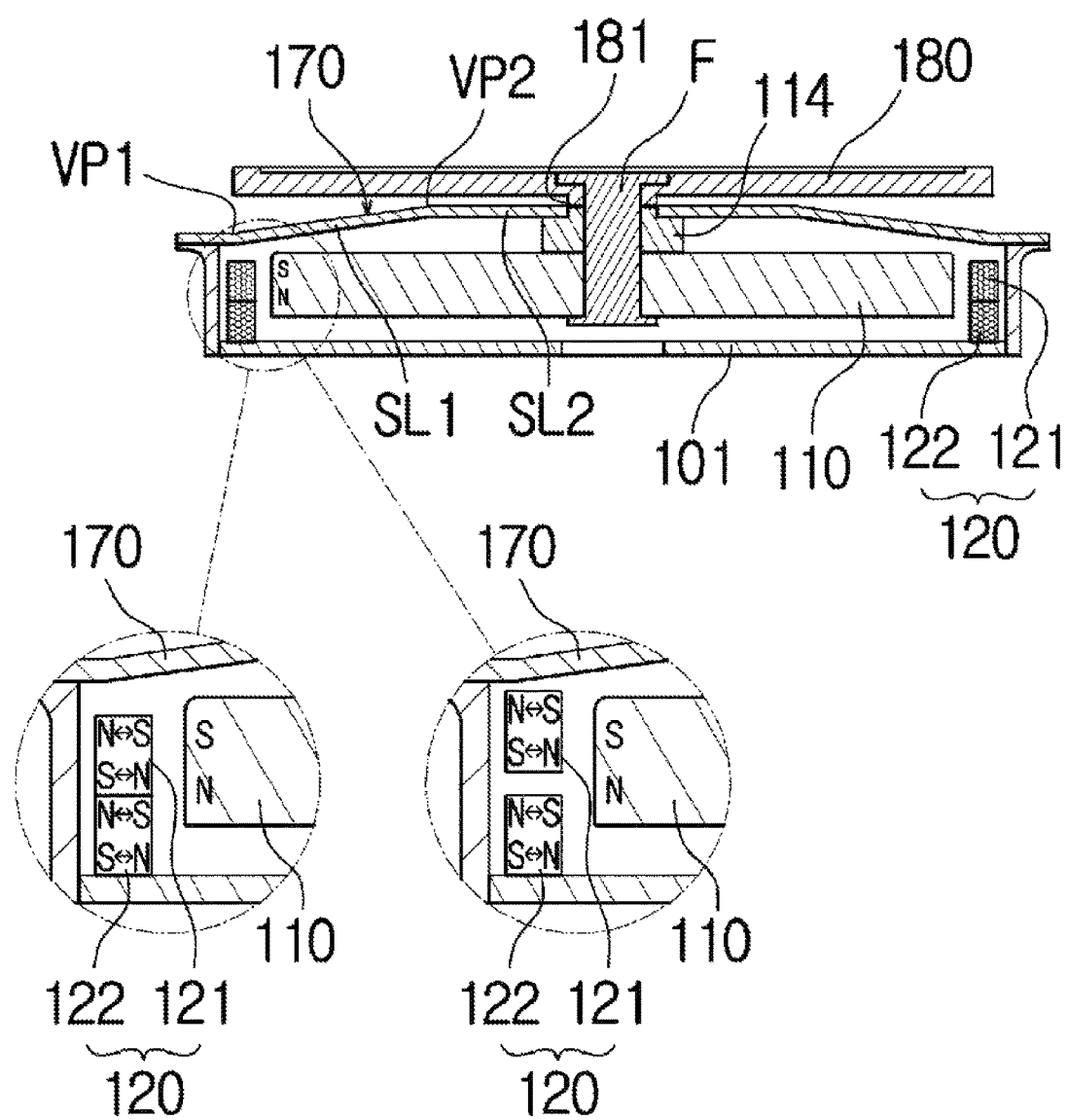
FIG. 25 is a cross-sectional view illustrating a configuration according to the eleventh embodiment of the present invention.

Then, in an eleventh embodiment of the present invention, as shown in FIGS. 24 and 25, a single magnetic circuit 110 consisting of only a magnet may generate a sound or a vibration while vibrating in a case 101 under the support of an elastic rebound body 170 according to a direction (polarity) of an alternating signal (N-S->S-N) applied to a pair of coils 120 disposed along a path of vibration, wherein the coils 120 may provide a buffering force in a direction of traveling of the magnetic circuit 110 and increase a repulsive force in the opposite direction to the direction of traveling.

In the above description, the magnet may be a rectangular, elliptical, square, or circular magnet block which has one end in a vibration direction magnetized as an S pole (top in the drawings) and the other end magnetized as an N pole (bottom in the drawings).

Meanwhile, according to the eleventh embodiment of the present invention, the coils 120 are fixed to the inside of the case 10, wherein the coils 120 formed in a pair may be disposed at a distance from an outer circumference of the magnetic circuit 110 along the path of vibration and may cause a vibration reaction of the magnetic circuit 110 while polarities of both ends thereof are changed according to an alternating signal applied from the outside. In the above description, each of the coils 120 may be disposed along a path of vibration of the magnetic circuit 110 in a state in which first and second coils 121 and 122 each having ends alternating from N-S poles to S-N poles are in contact with or spaced apart from each other, as shown in FIG. 25.

Figure 26:
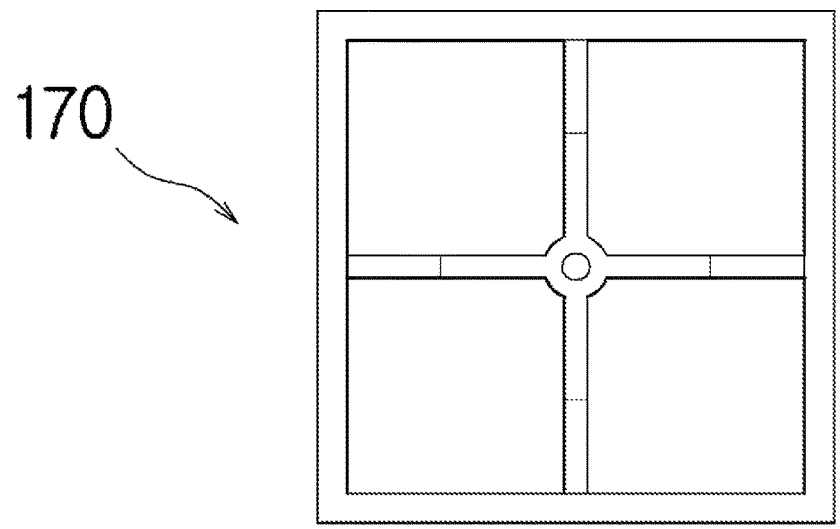
FIG. 26 is a plan view illustrating another example of an elastic rebound body according to the eleventh embodiment of the present invention.

Meanwhile, according to the eleventh embodiment of the present invention, the elastic rebound body 170 may be formed as a rectangle with a major axis and a minor axis, wherein the elastic rebound body 170 may elastically rebound and three-dimensionally support the magnetic circuit 110, or both the magnetic circuit 110 and an output transmission body 180, wherein the output transmission body 180 is configured to transmit an output to the outside or a human body, in a state in which the elastic body 170 has an altitude difference between both ends in the major axis direction and the middle part thereof and traverses an open part of a case 101 through the shortest path. In addition, the output transmission body 180 may a circular, square, rectangular, or elliptical block body. More specifically, the elastic rebound body 170 may be a straight-line elastic rebound arm that extends from one side to another side of a rectangular, elliptical, square (see FIG. 26) or circular (not shown) outer frame, wherein both sides closed to the outer frame of the elastic rebound arm are bent upwardly and extend into on ramps, and both ends of the on ramps extended are bent down and extend into a middle part extending horizontally. In the above description, the elastic rebound body 170 may have one elastic arm in the form of a line "–" or two elastic arms in the form of a cross "+".

According to the present invention as described above, the magnetic circuit 110 and the elastic rebound body 170 may be coupled to, or the magnetic circuit 110, the elastic body 170, and the output transmission body 180 may be coupled to each other by a fixing member F, such as rivet or screw, which passes through centers thereof. In this case, first spacer 114 and second spacer 181 may be provided between the magnetic circuit 110 and the elastic body 170, and between the elastic rebound body 170 and the output transmission body 180, respectively, so as to define a range for vibration of the magnetic circuit 110 and the output transmission body 180.

The first spacer 114 may be a separate block in the form of a rim, or may protrude from the center of one surface of the yoke 113 (the center is penetrated). In addition, the second spacer 181 may be a separate block in the form of a rim, or may protrude from the center of one surface of the output transmission body 180 (the center is penetrated).

Figure 27:
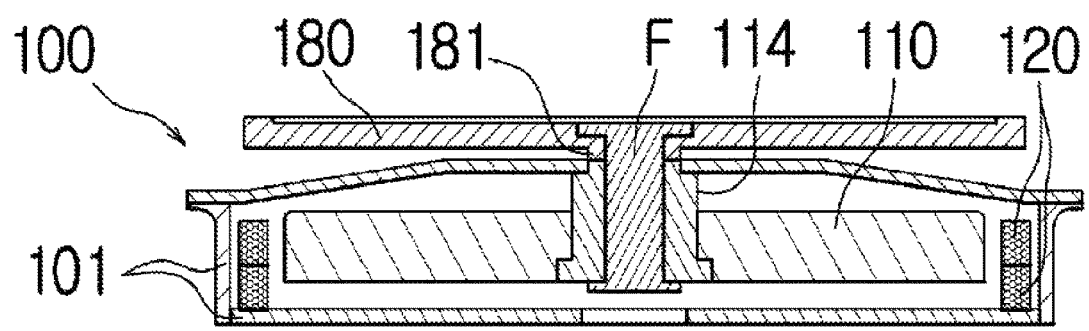
FIGS. 27 to 29 are cross-sectional views illustrating other coupling configurations of a magnetic circuit and/or an output transmission body and an elastic rebound body according to the present invention.
Figure 28:
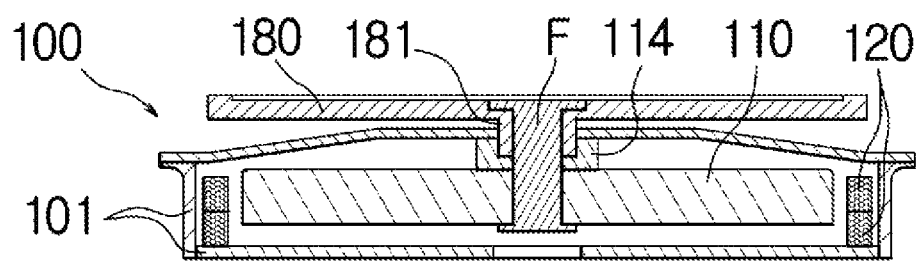
Figure 29:
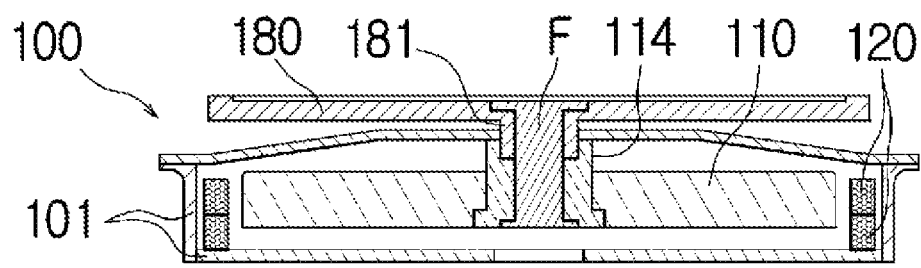

According to the present invention as described above, one side of the first spacer 114 may be placed on one surface at the center of the magnetic circuit 110 and the other side may penetrate the center of the elastic rebound body 170 and make contact with the second spacer 181 of the output transmission body 180, as shown in FIG. 25. In addition, as shown in FIG. 27, the first spacer 114 may provide a penetration coupling path of the fixing means F in a state in which one side of the first spacer 114 is placed on the other surface at the center of the magnetic circuit 110 while the other side thereof penetrates the center of the elastic rebound body 170 and makes contact with the second spacer 181 of the output transmission body 180. As shown in FIG. 28, the first spacer 114 may provide a penetration coupling path of the fixing means F while one side thereof is placed on one surface at the center of the magnetic circuit 110, the other side is in contact with a center surface of one side of the elastic rebound body 170, and the other side of the second spacer 181 penetrates the center surface of one side of the elastic body 170. Also, as shown in FIG. 29, the first spacer 114 may provide a penetration coupling path of the fixing means F in a state in which one side of the first spacer 114 is placed on the other surface at the center of the magnetic circuit while the other side thereof is in contact with the center surface of one side of the elastic rebound body 170, and the other side of the second spacer 181 penetrates the center surface of one side of the elastic rebound body 170.

Figure 30A:
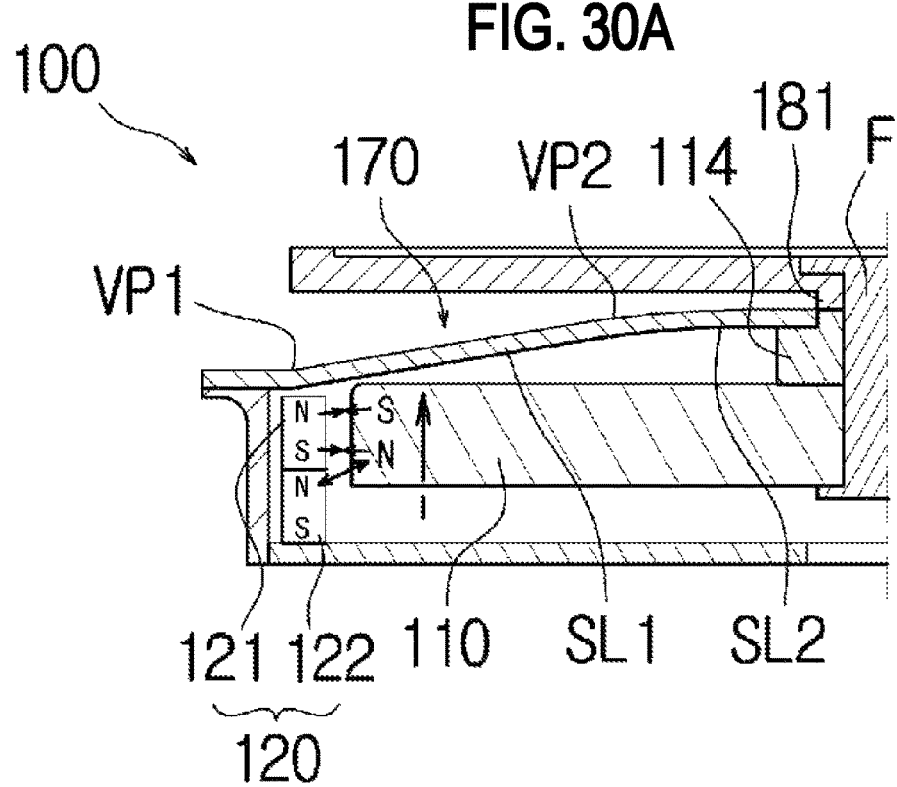
FIGS. 30A and 30B are partial cross-sectional views illustrating an operational state according to the eleventh embodiment of the present invention.

According to the present invention as described above, when both ends of each of first and second coils 121 and 122 constituting each coil 120 become N-S poles as a signal is externally applied to the first and second coils 121 and 122, as described in FIG. 30A the S pole of the magnetic circuit 110 magnetized to have S-N poles acts attractively with the N pole of the first coil 121 and the N pole of the magnetic circuit 110 acts attractively with the S pole of the first coil 121, so that the magnetic circuit 110 is pulled toward the first coil 121 (pulled upward in the drawing) and at the same time, the N pole of the magnetic circuit 110 acts repulsively against the N pole of the second coil 122, and thereby the magnetic circuit 110 is pushed away. That is, when each first coil and 2 121 and 122 has an N-S pole pair, the magnetic circuit 110 is attracted by the first coil 121, and at the same time, is repelled by the second coil 122, and thereby the vibration force is increased.

Figure 30B:
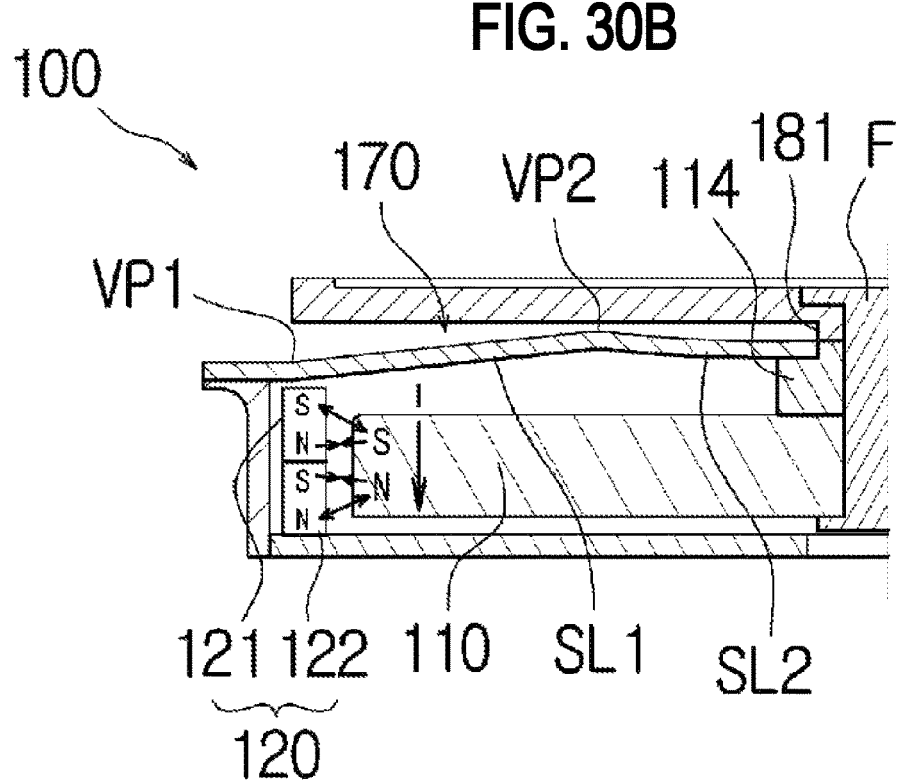

In this case, as shown in FIG. 30B, when both ends of each first coil and 2 121 and 122 are switched to S-N poles as a signal externally applied thereto alternates, the N pole of the magnetic circuit 110 magnetized to have S-N poles acts attractively with the N pole of the second coil 122 and the S pole of the magnetic circuit 110 acts attractively with the N pole of the first coil 121 while the S pole of the magnetic circuit 110 acts repulsively against the S pole of the first coil 121 and the N pole of the magnetic circuit 110 acts repulsively against the N pole of the first coil 121, so that the magnetic circuit 110 is pulled toward the second coil 122 (pulled downward in the drawing). At the same time, the N pole of the magnetic circuit 110 acts repulsively against the N pole of the second coil 122 to buffer the magnetic circuit 110 while resisting the further downward movement of the magnetic circuit 110. That is, when both ends of each first coil and 2 121 and 122 become S-N poles, the magnetic circuit 110 is attracted by the second coil 122 and at the same time is repelled by the second coil 122 and hence is buffered to prevent the collision with the case 101.

According to the present invention as described above, the magnetic circuit 110 generates a sound or a vibration while vibrating in the case 101 under the support of the elastic rebound body 170 according to a direction of an alternating signal applied to the coil 120, wherein the coil 120 may be provided on a path of vibration of the magnetic circuit 110 so as to increase a repulsive force in a direction opposite to a direction of traveling of the magnetic circuit 110 and to provide a buffering force in the direction of traveling, thereby enabling the component which increases the output to provide a vibration buffering force without any separate complicated buffering means while increasing the output.

Then, in a twelfth embodiment of the present invention, as shown in FIG. 31, the coil 120 may be disposed along a path of vibration of a magnetic circuit 110 in a state in which first and second coils 121 and 122, each of which has two ends alternating from N-S poles to S-N poles, are in contact with or spaced apart from each other, and buffering/repulsive member 1 123, which is an additional magnet, may be further disposed at a side of the first coil 121 while being in contact with or spaced apart from the first coil 121. In this case, a portion of each buffering/repulsive members 1 123 close to the S pole position of the magnetic circuit 110 may be identically magnetized to have the S polarity.

Figure 32A:
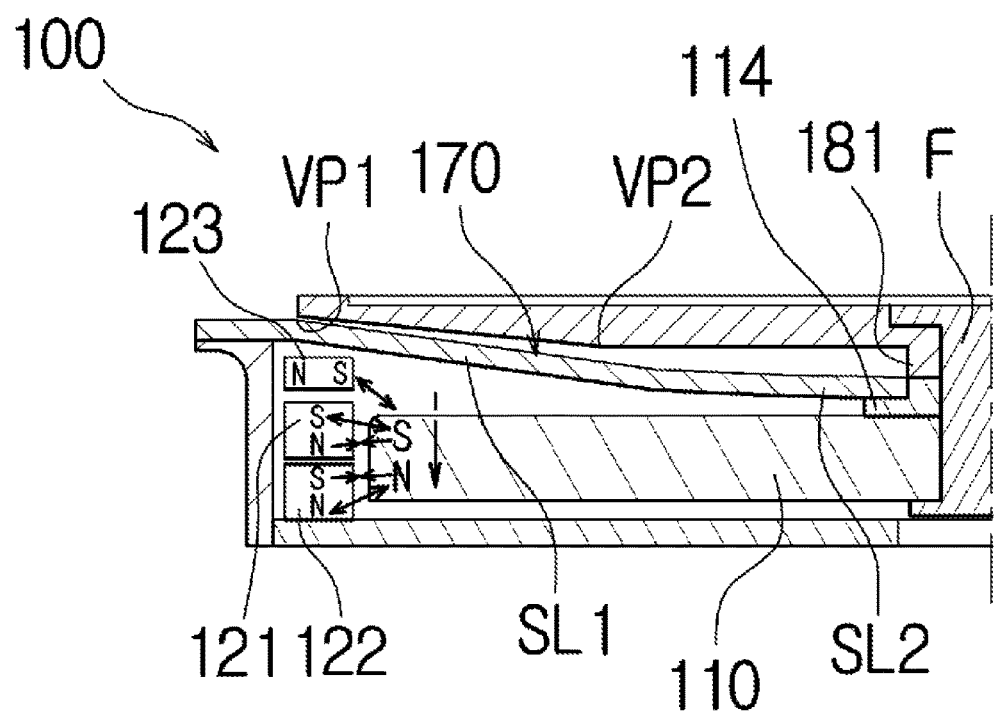
FIGS. 32A and 32B are cross-sectional views illustrating an operational state according to the twelfth embodiment of the present invention.

Accordingly, as shown in FIG. 32A, when both ends of each of first and second coils 121 and 122 constituting the coil 120 become S-N poles as a signal is externally applied to the first and second coils 121 and 122, the S pole of the magnetic circuit 110 magnetized to have S-N poles acts repulsively against the S pole of the first coil 121 and the S pole of the buffering/repulsive member 1 123 (repulsion is increased) and the N pole of the magnetic circuit 110 acts attractively with the S pole of the second coil 122, so that the magnetic circuit 110 is pulled toward the second coil 122. At this time, the N pole of the magnetic circuit 110 acts repulsively against the N pole of the second coil 122 to thereby buffer the magnetic circuit 110 while resisting the further downward movement of the magnetic circuit 110. That is, when both ends of each of the first and second coils 121 and 122 become the S-N poles, the magnetic circuit 110 magnetized to have the S-N poles are pulled by the N pole and the S pole formed on the middle parts of the first coil 121 and the second coil 122, and at the same time, the S pole of the magnetic circuit 110 is repelled by the S pole of the first coil 121, and thereby the vibration force is magnified. At this time, the N pole of the second coil 122 repels the N pole of the magnetic circuit 110 and resists against the magnetic circuit 110 to restrain the magnetic circuit 110 from vibrating beyond the range of vibration due to the increased vibration force.

Figure 32B:
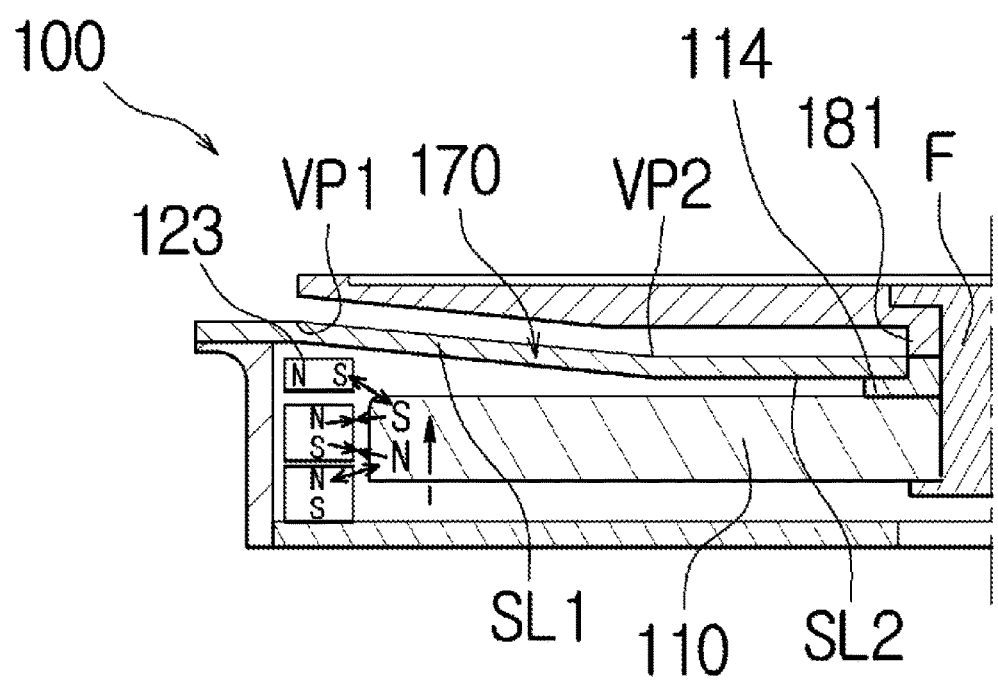

In this case, as shown in FIG. 32B, when both ends of each first coil and 2 121 and 122 become N-S poles as an externally applied signal alternates, the S pole of the magnetic circuit 110 magnetized to have the S-N poles acts attractively with the N pole of the first coil 121 and the N pole of the magnetic circuit 110 acts attractively with the S pole of the first coil 121 so that the magnetic circuit 110 is pulled toward the first coil 121 (pulled upward in the drawing), and at the same time, the N pole of the magnetic circuit 110 acts repulsively against the N pole of the second coil 122 so that the magnetic circuit 110 is pushed away. That is, when each first coil and 2 121 and 122 has the N-S pole pair, the magnetic circuit 110 magnetized to have the S-N poles are attracted by the first coil 121 having the N-S poles, simultaneously the N pole of the magnetic circuit 110 is repelled by the N pole of the second coil 122, and thereby the vibration force is increased. At this time, the S pole of the buffering/repulsive member 1 123 is repelled by the S pole of the magnetic circuit 110 and resists against the magnetic circuit 110 to buffer and restrain the magnetic circuit 110 from vibrating beyond the range of vibration due to the increased vibration force.

Figure 33:
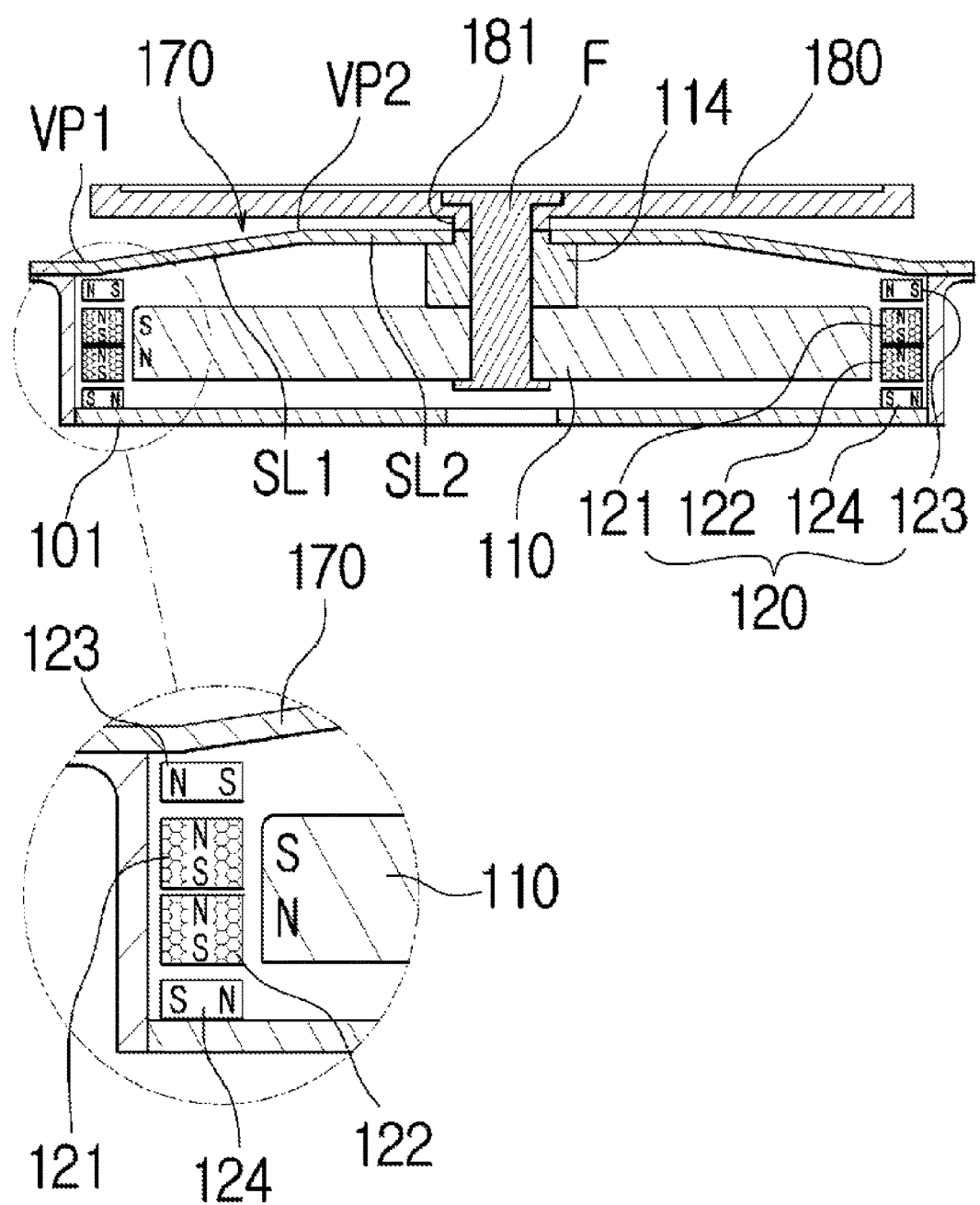
FIG. 33 is a cross-sectional view illustrating a configuration according to a thirteenth embodiment of the present invention.

Then, in a thirteenth embodiment of the present invention, as shown in FIG. 33, the coil 120 may be disposed along a path of vibration of a magnetic circuit 110 in a state in which first and second coils 121 and 122, each having ends alternating from N-S poles to S-N poles, are in contact with or spaced apart from each other, buffering/repulsive member 1 123, which is an additional magnet, may be further disposed at a side of the first coil 121 while being in contact with or spaced apart from the first coil 121, and buffering/repulsive member 2 124, which is another additional magnet, may be further disposed at a side of the second coil 122 while being in contact with or spaced apart from the second coil 122. In this case, a portion of the buffering/repulsive member 1 123 close to the S pole position of the magnetic circuit 110 may be magnetized to have the same S polarity as the S pole, and a portion of the buffering/repulsive member 2 124 close to the N pole position of the magnetic circuit 110 may be magnetized to have the same N polarity as the N pole.

Figure 34A:
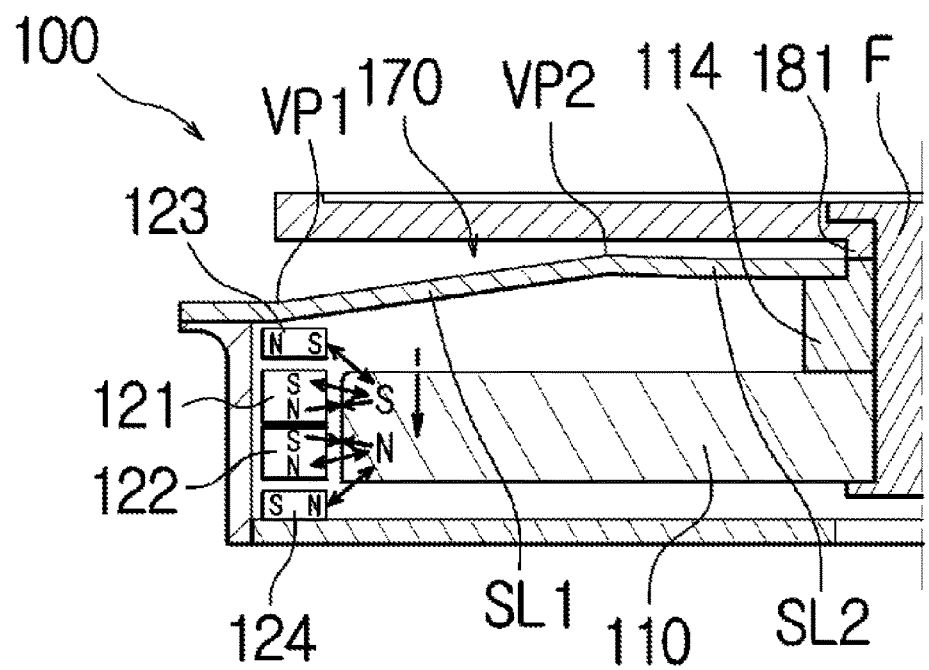
FIGS. 34A and 34B are cross-sectional views illustrating an operational state according to the thirteenth embodiment of the present invention.

Accordingly, as shown in FIG. 34A, when both ends of each of the first and second coils 121 and 122 constituting the coil 120 become S-N poles as a signal is externally applied to the first and second coils 121 and 122, the S pole of the magnetic circuit 110 magnetized to have S-N poles acts repulsively against the S pole of the first coil 121 and the S pole of the buffering/repulsive member 1 123 (repulsion is increased) and the N pole of the magnetic circuit 110 acts attractively with the S pole of the second coil 122, so that the magnetic circuit 110 is pulled toward the second coil 122. At this time, the N pole of the magnetic circuit 110 acts repulsively against the N pole of the second coil 122 and the N pole of the buffering/repulsive member 2 124 to thereby buffer the magnetic circuit 110 while resisting the further downward movement of the magnetic circuit 110. That is, when both ends of each of the first and second coils 121 and 122 become the S-N poles, the magnetic circuit 110 magnetized to have the S-N poles are pulled by the N pole and the S pole formed on the middle parts of the first coil 121 and the second coil 122, at the same time, the S pole of the magnetic circuit 110 is repelled by the S pole of the first coil 121 and the S pole of the buffering/repulsive member 2 124, and thereby the vibration force is magnified. At this time, the N pole of the second coil 122 and the N pole of the buffering/repulsive member 2 124 repel the N pole of the magnetic circuit 110 and resist against the magnetic circuit 110 to restrain the magnetic circuit 110 from vibrating beyond the range of vibration due to the increased vibration force.

Figure 34B:
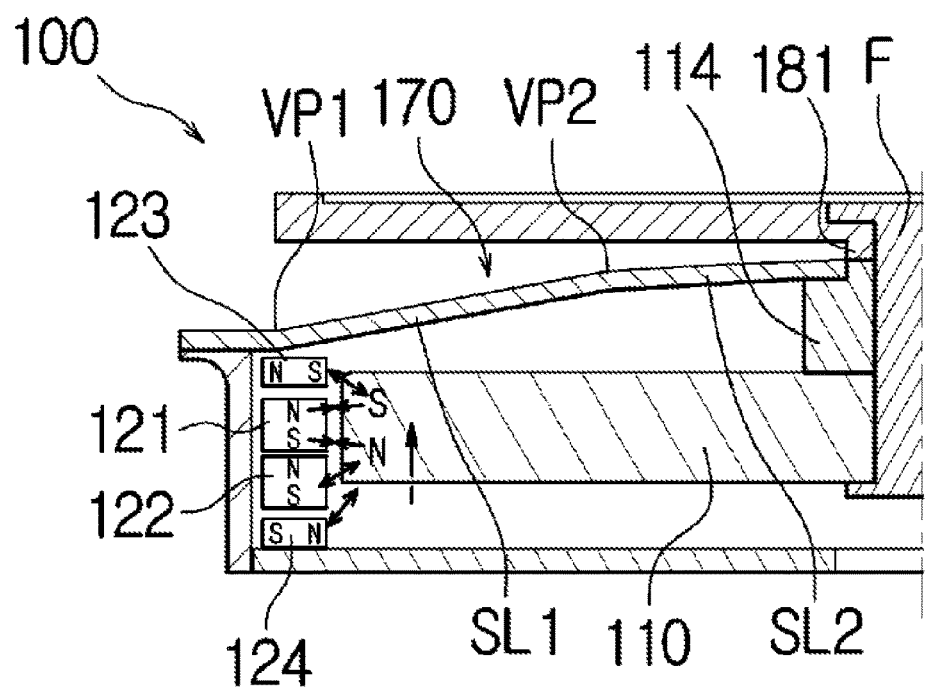

In this case, as shown in FIG. 34B, when both ends of each first coil and 2 121 and 122 become N-S poles as an externally applied signal alternates, the S pole of the magnetic circuit 110 magnetized to have the S-N poles acts attractively with the N pole of the first coil 121 and the N pole of the magnetic circuit 110 acts attractively with the S pole of the first coil 121 so that the magnetic circuit 110 is pulled toward the first coil 121 (pulled upward in the drawing), and at the same time, the N pole of the magnetic circuit 110 acts repulsively against the N pole of the second coil 122 and the N pole of the buffering/repulsive member 124 so that the magnetic circuit 110 is pushed away. At this time, the S pole of the buffering/repulsive member 1 123 is repelled by the S pole of the magnetic circuit 110 and resists against the magnetic circuit 110 to buffer and restrain the magnetic circuit 110 from vibrating beyond the range of vibration due to the increased vibration force. That is, when each first coil and 2 121 and 122 has the N-S pole pair, the magnetic circuit 110 magnetized to have the S-N poles are attracted by the first coil 121 having the N-S poles, simultaneously the N pole of the magnetic circuit 110 is repelled by the N pole of the second coil 122, and thereby the vibration force is increased/At this time, the S pole of the buffering/repulsive member 1 123 is repelled by the S pole of the magnetic circuit 110 and resists against the magnetic circuit 110 to buffer and restrain the magnetic circuit 110 from vibrating beyond the range of vibration due to the increased vibration force.

Figure 35:
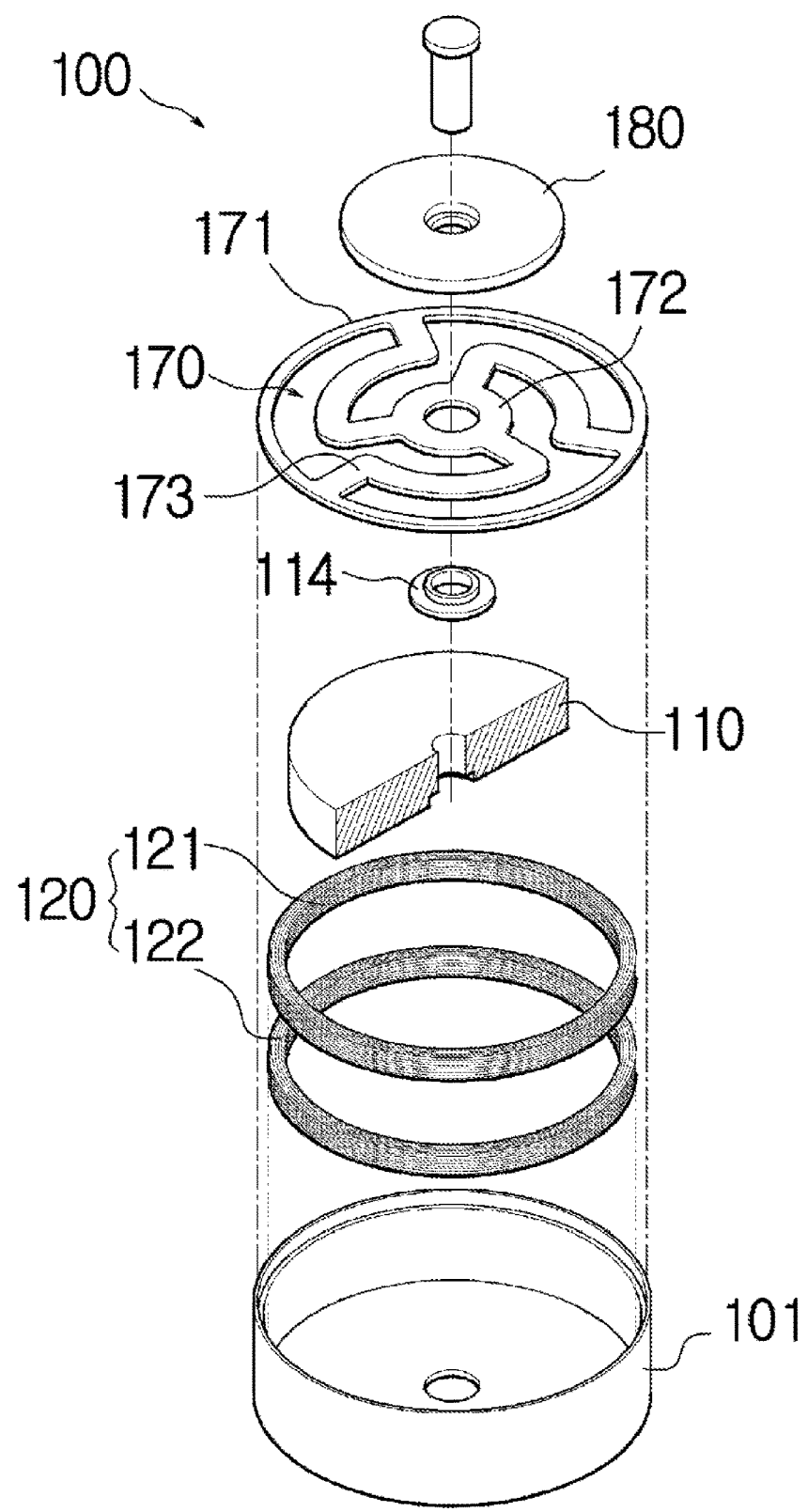
FIG. 35 is a cross-sectional view illustrating a configuration according to a fourteenth embodiment of the present invention.

Finally, in a fourteenth embodiment of the present invention, as shown in FIG. 35, a sensory signal output apparatus 100 is formed entirely in circular shape, and the elastic rebound body 170 includes an elastic rebound arm 173 formed between and spaced apart from a circular outer frame 171 and a center surface 172, wherein one end of the elastic rebound arm 173 is connected to the outer frame 171 and the other end is connected to the center surface 172, and the elastic rebound arm 173 may extend in an arc (curved) form while the connecting portions are located at mutually displaced positions.

DESCRIPTION OF REFERENCE NUMERALS

100: SENSORY SIGNAL OUTPUT APPARATUS, 101: CASE, 110: MAGNETIC CIRCUIT, 111: MAGNET, 112: TOP PLATE, 113: YOKE, 114: FIRST SPACER, 120: COIL, 170: ELASTIC REBOUND BODY, 180: OUTPUT TRANSMISSION BODY, 181: SECOND SPACER, F: FIXING MEANS, VP1, VP2: FIRST VIBRATION POINT, SECOND VIBRATION POINT, SL1, SL2: FIRST ELASTIC REBOUND AND SUPPORT PATH, SECOND ELASTIC REBOUND AND SUPPORT PATH

The invention claimed is:

1. A sensory signal output apparatus which generates a sound or a vibration while a magnetic circuit thereof vibrates according to directions of an alternating signal applied to a coil, the sensory signal output apparatus comprising
an elastic rebound body which elastically rebounds and three-dimensionally supports the magnetic circuit, or both the magnetic circuit and an output transmission body, wherein the output transmission body is configured to transmit an output to an outside or a human body,
wherein the elastic rebound body has an altitude difference between both side ends and middle part thereof and traverses open part of a case through the shortest path,
wherein the elastic rebound body has a linear elastic rebound arm which extends from one side to another side of a circular, square, elliptical, or rectangular outer frame, and
wherein both sides closed to the outer frame of the elastic rebound arm are bent upwardly and extend into on ramps, and both ends of the on ramps extended are bent down and extend into a middle part extending horizontally.

2. The sensory signal output apparatus of claim 1, wherein the upwardly bent portions of the outer frames become first vibration points and horizontally bent portions become second vibration points, the vibration points are reference points from which vibration starts, the upwardly inclined portions of both outer frames are first elastic rebound and support paths, the horizontal portions in the middle part are second elastic rebound and support paths, and the elastic rebound and support paths are portions which are elastically rebounding, where vibration actually takes place.

3. The sensory signal output apparatus of claim 1, wherein the magnetic circuit includes:
magnets which generate magnetic forces while being formed in a circular or elliptical ring-type or a block type which is divided into two segments so as to form a space at a center thereof;
top plates which are stacked on one surface of the magnets and concentrate the magnetic forces of the magnets; and
a yoke which has protrusions to provide a surface to which the magnets are fixedly mounted, and at the same time to provide paths through which magnetic flux pass,
wherein gaps in which the coil is placed are formed in inner circumferential spaces between the magnets and the top plates or a space in a center portion.

4. The sensory signal output apparatus of claim 3, wherein the magnets of the magnetic circuit are fixed to the yoke by bonding, and a center of the yoke is coupled to the elastic rebound body and the output transmission body by a fixing means F penetrating therethrough,
wherein first spacer and second spacer are provided between the yoke and the elastic rebound body and between the elastic rebound body and the output transmission body, respectively, to prevent interference during vibration.

5. A sensory signal output apparatus which generates a sound or a vibration while a magnetic circuit thereof vibrates according to a direction of an alternating signal applied to a coil, the sensory signal output apparatus comprising
an elastic rebound body which elastically rebounds and three-dimensionally supports a pair of magnetic circuits, wherein the pair of magnetic circuits are spaced apart from each other, or supports both the magnetic circuits and an output transmission body, wherein the output transmission body is configured to transmit an output to an outside or a human body,
wherein the elastic rebound body has an altitude difference between both side ends and the middle part thereof and traverses a major axis in an open part of a case through the shortest path, wherein the elastic rebound body is a linear elastic rebound arm which extends from one side to another side of an elliptical or rectangular outer frame having a major axis and a minor axis, and wherein both sides closed to the outer frame of the elastic rebound arm are bent upwardly and extend into on ramps, and both ends of the on ramps extended are bent down and extend into a middle part extending horizontally.

6. The sensory signal output apparatus of claim 5, wherein the magnetic circuits includes:

magnets which generate magnetic forces while being formed in a pair of circular or elliptical ring-type magnets spaced apart from each other or formed in a block type which is divided into three segments so as to form a space at each side thereof;

top plates which are stacked on one surface of each of the magnets and concentrate magnetic forces of the magnets; and a yoke which has protrusions to provide surfaces to which the magnets are fixedly mounted, and at the same time to provide paths through which magnetic flux pass, and wherein gaps in which the coil is placed are formed in inner circumferential spaces between the magnets and the top plates or in spaces formed at each side of the magnets.

7. The sensory signal output apparatus of claim 1, wherein the magnetic circuits, or both the magnetic circuits and the output transmission body configured to transmit the output are fixed to a surface of the middle part of the elastic rebound body in opposite directions, wherein the middle part maintains in the horizontal position.

8. A sensory signal output apparatus which generates a sound or a vibration while a magnetic circuit thereof vibrates according to the directions of an alternating signal applied to a coil, the sensory signal output apparatus comprising an elastic rebound body which includes an elliptical or rectangular outer frame and fixing surfaces to fix thereto the magnetic circuit, or both the magnetic circuit and an output transmission body configured to transmit an output to an outside or a human body, wherein the fixing surfaces are provided at positions of middle of the elastic rebound body, or at positions spaced apart from each other along the length direction of the elliptical or rectangular outer frame, wherein the fixing surfaces exhibit an altitude difference from the outer frame at both sides thereof, wherein one of the fixing surfaces is connected to one of facing major axes of the outer frame and the other fixing surface is connected to the other facing major axis of the outer frame.

9. The sensory signal output apparatus of claim 8, wherein in the pair of the fixing surfaces, sides of the fixing surfaces facing each other are connected to a straight path of the elastic rebound body, and wherein the opposite side of one of the fixing surfaces is connected to one of the facing major axes of the outer frame, and the opposite side of the other fixing surface is connected to the other facing major axis of the outer frame.

10. The sensory signal output apparatus of claim 8, wherein one of the fixing surfaces is connected to one of the facing major axes of the outer frame, the other fixing surface is connected to the other facing major axis of the outer frame, and wherein the fixing surfaces spaced apart from each other are provided in a pair.

11. The sensory signal output apparatus of claim 8, wherein facing sides of a pair of the fixing surfaces spaced apart from each other are connected to a straight path of the elastic rebound body, and wherein the opposite side of one fixing surface is symmetrically connected to the facing major axis of the outer frame, and the opposite side of the other fixing surface is also symmetrically connected to the facing major axis of the outer frame.

12. The sensory signal output apparatus of claim 8, wherein one side of the fixing surface is symmetrically connected to the facing major axis of the outer frame, the opposite side of the fixing surface is also symmetrically connected to the facing major axis of the outer frame, and fixing surfaces spaced apart from each other are provided in a pair.

13. The sensory signal output apparatus of claim 1, wherein the magnetic circuit including a magnet consisting of a circular or elliptical magnet and a ring-type or block-type magnet spaced apart from an outer frame of the magnet, a top plate consisting of top plates stacked on one surface of the respective magnet and magnet, and a yoke providing a surface on which the magnet is mounted and a coil positioned in a gap between the magnet and the magnet are included, wherein the magnetic circuit is fixed to the elastic rebound body by a fixing means F which penetrates both sides of the magnet.

14. The sensory signal output apparatus of claim 1, wherein the magnetic circuits in a pair are elastically supported at a distance from each other by the single elastic rebound body, the middle part of the elastic rebound body is supportively fixed to the case by a supporting member S, the coil is positioned in a gap defined by each magnetic circuit and each protrusion of a yoke, and the output transmission body is fixed through an outer surface of the elastic rebound body by a fixing means which penetrates one magnetic circuit and the other magnetic circuit.

15. The sensory signal output apparatus of claim 1, wherein the magnetic circuit consists of top plates stacked on one surface of magnets and a yoke stacked on the other surface, the magnetic circuits in a pair are elastically rebounded and supported at a distance from each other by the single elastic rebound body, the middle part of the elastic rebound body is supportively fixed to the case by a supporting member, and the coil is positioned in an outer circumferential direction of each magnetic circuit, and the output transmission body is fixed through an outer surface of the elastic rebound body by a fixing member which penetrates one magnetic circuit and the other magnetic circuit.

16. The sensory signal output apparatus of claim 1, wherein a pair of magnetic circuits spaced apart from each other, each of which is formed of a stack of magnets and top plates, are provided on one surface of a single yoke, and the coil is positioned at a position with distance from an outer circumference of each magnetic circuit, wherein each magnetic circuit is fixed through the elastic rebound body by a fixing means F and the output transmission body is fixed to an outer surface of the elastic rebound body.

17. The sensory signal output apparatus of claim 1, wherein the magnetic circuit is formed by a stack of a magnet and a top plate on one surface of a single yoke, and the coil is positioned in an outer circumferential direction of the magnetic circuit, wherein the magnetic circuit is fixed to the elastic rebound body by a pair of fixing means penetrating at a distance from each other and the output transmission body is fixed to an outer surface of the elastic rebound body.

18. The sensory signal output apparatus of claim 1, wherein a pair of magnetic circuits consisting of magnets only and being spaced apart from each other is provided, and the coil is positioned at a distance from an outer circumference of each magnetic circuit, wherein each magnetic circuit is fixed through the elastic rebound body by a fixing means F, the output transmission body is fixed to an outer surface of the elastic rebound body, the coil consists of first coil and second coil which are disposed to be in contact with or spaced apart from each other in a vibration direction of the magnetic circuit, wherein magnetic poles of the respective first and second coils alternate between an N-S pole pair, i.e., an N-S-N-S pole pattern, and an S-N pole pair, i.e., an S-N-S-N pole pattern and the magnet is in a state of being magnetized to have S-N poles.

19. The sensory signal output apparatus of claim 1, wherein the magnetic circuit consists of a magnet only, the coil is positioned at a distance from an outer circumference of the magnetic circuit, wherein both sides of the magnetic circuit are each fixed through the elastic rebound body by a fixing means, the output transmission body is fixed to an outer surface of the elastic rebound body, and the coil consists of first coil and second coil which are disposed to be in contact with or spaced apart from each other in a vibration direction of the magnetic circuit, wherein magnetic poles of the respective first and second coils alternate between an N-S pole pair, i.e., an N-S-N-S pole pattern, and an S-N pole pair, i.e., an S-N-S-N pole pattern, and the magnet is in a state of being magnetized to have S-N poles.

20. The sensory signal output apparatus of claim 1, wherein the single magnetic circuit consisting of only a magnet generates a sound or a vibration while vibrating in the case under a support of the elastic body according to a direction of an alternating signal applied to a pair of coils disposed along a path of vibration, wherein the coils provide a buffering force in a direction of traveling of the magnetic circuit and multiply a repulsive force in an opposite direction to the direction of traveling.

21. The sensory signal output apparatus of claim 5, wherein the coil is disposed along a path of vibration of the magnetic circuit in a state in which first and second coils, each of which has two ends alternating from N-S poles to S-N poles, are in contact with or spaced apart from each other.

22. The sensory signal output apparatus of claim 5, wherein the coil is disposed along a path of vibration of the magnetic circuit in a state in which first and second coils, each of which has two ends alternating from N-S poles to S-N poles, are in contact with or spaced apart from each other, and buffering/repulsive member, which is an additional magnet, is further disposed at a side of the first coil while being in contact with or spaced apart from the first coil.

23. The sensory signal output apparatus of claim 5, wherein the coil 120 is disposed along a path of vibration of the magnetic circuit in a state in which first and second coils, each of which has two ends alternating from N-S poles to S-N poles, are in contact with or spaced apart from each other, buffering/repulsive member, which is an additional magnet, is further disposed at a side of the first coil while being in contact with or spaced apart from the first coil, and buffering/repulsive member, which is another additional magnet, is further disposed at a side of the second coil while being in contact with or spaced apart from the second coil.

24. The sensory signal output apparatus of claim 20, wherein the elastic rebound body includes an elastic arm formed between and spaced apart from a circular outer frame and a center surface, wherein one end of the elastic rebound arm is connected to the outer frame and the other end is connected to the center surface and the elastic rebound arm extends in an arc form while connecting portions are located at mutually displaced positions.

* * * * *